(12) United States Patent
Yerramalli et al.

(10) Patent No.: US 11,582,006 B2
(45) Date of Patent: Feb. 14, 2023

(54) WINDOW FOR TRANSMITTING A POSITIONING REFERENCE SIGNAL

(71) Applicant: QUALCOMM Incorporated, San Diego, CA (US)

(72) Inventors: Srinivas Yerramalli, San Diego, CA (US); Xiaoxia Zhang, San Diego, CA (US); Sony Akkarakaran, Poway, CA (US); Jing Sun, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/001,653

(22) Filed: Aug. 24, 2020

(65) Prior Publication Data

US 2021/0083830 A1 Mar. 18, 2021

Related U.S. Application Data

(60) Provisional application No. 62/900,355, filed on Sep. 13, 2019.

(51) Int. Cl.
*H04L 5/00* (2006.01)
*H04W 74/00* (2009.01)

(52) U.S. Cl.
CPC ......... *H04L 5/0053* (2013.01); *H04W 74/002* (2013.01)

(58) Field of Classification Search
CPC . H01L 23/3192; H01L 23/481; H01L 23/485; H01L 23/525; H01L 23/49816;
(Continued)

(56) References Cited

U.S. PATENT DOCUMENTS

| 2010/0046494 A1* | 2/2010 | Palanki | H04W 56/00 370/344 |
| 2014/0287769 A1* | 9/2014 | Taori | H04W 74/0808 455/450 |

(Continued)

OTHER PUBLICATIONS

CATT: "NR Positioning Reference Signals for OTDOA", 3GPP Draft, 3GPP TSG RAN WG1 Meeting #95, R1-1812616, NR POS PRS, 3rd Generation Partnership Project (3GPP), Mobile Competence Centre ; 650, Route Des Lucioles ; F-06921 Sophia-Antipolis Cedex France v' al. RAN WG1, No. Spokane, USA, Nov. 12, 2018-Nov. 16, 2018, Nov. 11, 2018 (Nov. 11, 2018), XP051554572, 14 pages, Retrieved from the Internet: URL: http://www.3gpp.org/ftp/Meetings%5F3GPP%5FSYNC/RAN1/Docs/R1%2D1812616%2Ezip. [retrieved on Nov. 11, 2018] chapters 3-6.

(Continued)

*Primary Examiner* — Stephen J Clawson
(74) *Attorney, Agent, or Firm* — Qualcomm Incorporated

(57) ABSTRACT

Methods, systems, and devices for transmitting a positioning reference signal over a channel within a window including a set of positioning reference signal transmission opportunities. A device may identify the window and perform a channel access procedure to access the channel during the window. Based on performing the channel access procedure, the device may obtain access to the channel and determine that a portion of the positioning reference signal transmission opportunities are remaining within the window. The device may transmit a positioning reference signal during one or more of the remaining positioning reference signal transmission opportunities. In some cases, the device may refrain from transmitting a positioning reference signal during a portion of a positioning reference signal transmission opportunity even if the device gains access to the channel during that portion of the positioning reference signal transmission opportunity.

28 Claims, 20 Drawing Sheets

(58) Field of Classification Search
CPC ............ H01L 23/5384; H01L 23/5385; H01L 23/5386; H01L 23/3128; H01L 23/3135; H01L 24/14; H01L 24/94; H01L 21/0274; H01L 21/76802; H01L 21/76877; H04L 5/0053; H04L 5/005; H04W 74/002; H04W 16/14; H04W 64/00

See application file for complete search history.

(56) References Cited

U.S. PATENT DOCUMENTS

| | | | |
|---|---|---|---|
| 2016/0135148 A1* | 5/2016 | Novlan | H04L 5/006 370/329 |
| 2016/0212764 A1* | 7/2016 | Yin | H04W 74/002 |
| 2017/0353278 A1 | 12/2017 | Patel et al. | |
| 2018/0054750 A1 | 2/2018 | Lee et al. | |
| 2018/0054792 A1* | 2/2018 | Lee | H04W 64/00 |
| 2018/0343056 A1 | 11/2018 | Radulescu et al. | |
| 2019/0342826 A1* | 11/2019 | Talarico | H04L 5/0048 |
| 2020/0053571 A1* | 2/2020 | Tsai | H04L 1/0045 |

OTHER PUBLICATIONS

Fischer S., "Observed Time Difference of Arrival (OTDOA) Positioning in 3GPP LTE", Qualcomm Technologies Inc, Jun. 6, 2014 (Jun. 6, 2014), pp. 1-62, XP055284784, Retrieved from the Internet: URL: http://www.terranautx.com/s/Qualcomm-OTDOA-positioning-in-LTE-June-2014.pdf, p. 9, chapter 3.1;p. 13, chapter 4.2.1;p. 15, chapter 5.1;p. 18, chapter 5.4;pp. 31-33, chapter 6.3;pp. 37-39, chapter 6.5; pp. 40-42, chapters 7.1.1-7.1.3.

International Search Report and Written Opinion—PCT/US2020/047798—ISA/EPO—dated Nov. 18, 2020 (194935WO).

LG Electronics: "Discussion on Potential Enhancements for Indoor Positioning", 3GPP Draft, R1-150229 Discussion on potential enhancements for indoor positioning, 3rd Generation Partnership Project (3GPP), vol. RAN WG1, Athens, Greece; Feb. 8, 2015, pp. 1-4, XP050933443, retrieved from the Internet: URL: http://www.3gpp.org/ftp/Meetings_3GPP_SYNC/RAN1/Docs/.

LG Electronics: "Discussion on positioning technology utilizing unlicensed spectrum", 3GPP Draft; R1-151541, 3rd Generation Partnership Project (3GPP), Mobile Competence Centre; 650, Route Des Lucioles; F-06921 Sophia-Antipolis Cedex; France, vol. RAN WG1, No. Belgrade, Serbia; Apr. 20, 2015-Apr. 24, 2015, Apr. 19, 2015 (Apr. 19, 2015), XP050934413, 2 Pages, Retrieved from the Internet: URL:http://www.3gpp.org/ftp/Meetings_3GPP_SYNC/RAN1/Docs/ [retrieved on Apr. 19, 2015].

Mediatek Inc: "On Downlink OTDOA and Angle based techniques", 3GPP TSG-RAN WG1 #96 Meeting, R1-1903239, Athens, Greece, Feb. 25-Mar. 1, 2019, 8 Pages, Retrieved from the Internet: URL: http://www.3gpp.org/ftp/tsg%5Fran/WG1%5FRL1/TSGR1%5F96/Docs/R1%2D1903239%2Ezip. [retrieved on Feb. 21, 2019] chapters 1-3.

* cited by examiner

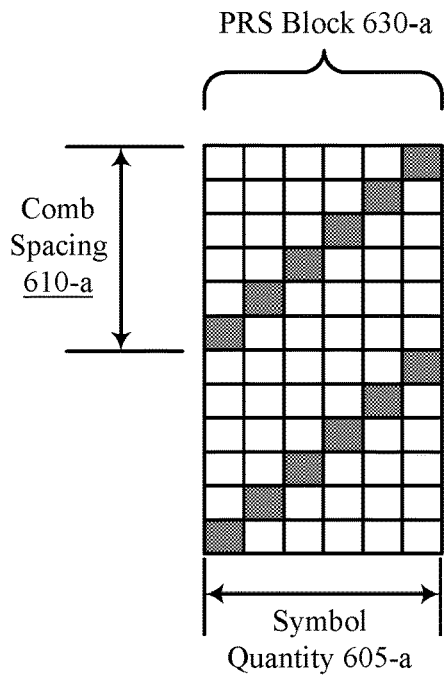
FIG. 6A
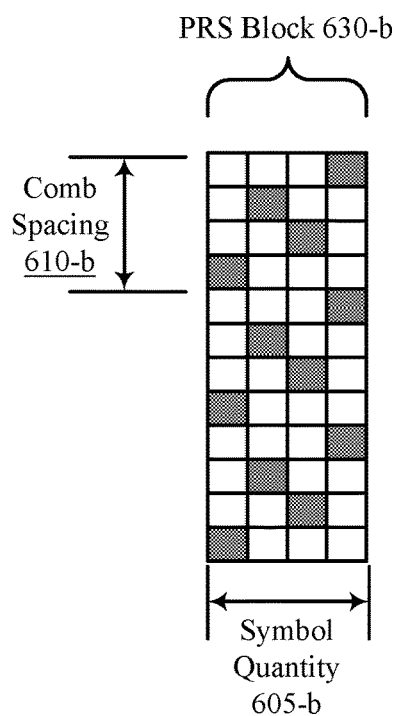
FIG. 6B
 PRS

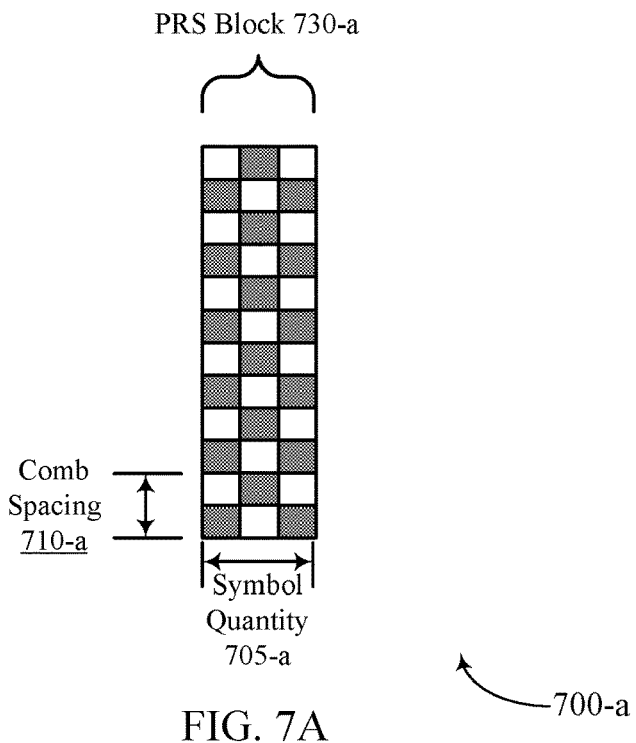
FIG. 7A
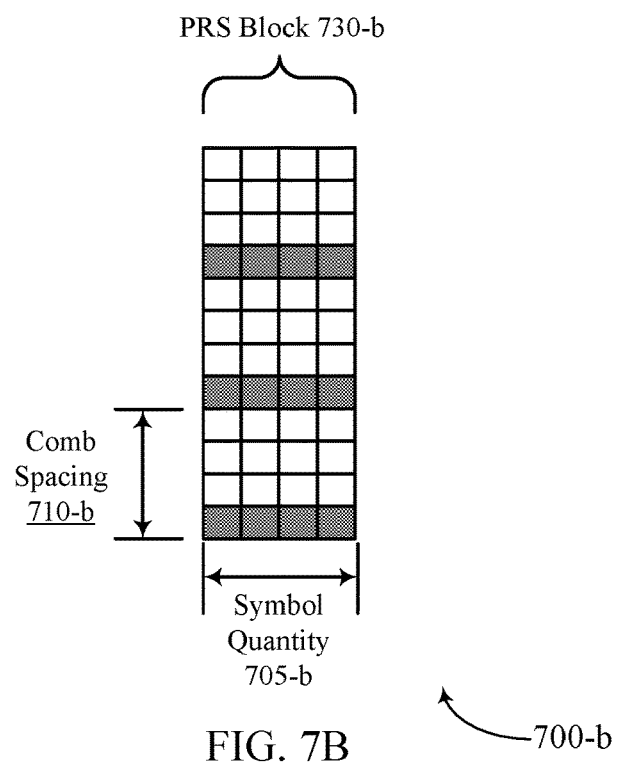
FIG. 7B
 PRS

WINDOW FOR TRANSMITTING A POSITIONING REFERENCE SIGNAL

CROSS REFERENCE

The present application for patent claims the benefit of U.S. Provisional Patent Application No. 62/900,355 by YERRAMALLI et al., entitled "WINDOW FOR TRANSMITTING A POSITIONING REFERENCE SIGNAL," filed Sep. 13, 2019, assigned to the assignee hereof, and expressly incorporated by reference herein.

FIELD OF TECHNOLOGY

The following relates generally to wireless communications and more specifically to a window for transmitting a positioning reference signal.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The present disclosure relates to methods, systems, devices, and apparatuses that support a window for transmitting a positioning reference signal (PRS). Generally, the described techniques provide for transmitting one or more PRSs during a window including multiple PRS transmission opportunities on a channel. The device may identify the window and perform a channel access procedure during the window to attempt to gain access to the channel. If the device gains access to the channel during the window, the device may determine that a subset of the PRS transmission opportunities are remaining within the window. The device may transmit one or more PRS transmissions during one or more of the subset of remaining PRS transmission opportunities. In some cases, the device may gain access to the channel and determine that there is a portion of a PRS transmission opportunity remaining within the window. Here, the device may refrain from transmitting a PRS during the portion of the PRS transmission opportunity.

A method of wireless communication is described. The method may include identifying a window including a set of PRS transmission opportunities for a channel, performing a channel access procedure to access the channel for transmission of a positioning reference signal during the window, determining at least a subset of the set of PRS transmission opportunities that are remaining in the window subsequent to obtaining access to the channel during the window as a result of the channel access procedure, and transmitting a PRS during one or more of the at least the subset of the set of PRS transmission opportunities that are remaining in the window.

An apparatus for wireless communication is described. The apparatus may include a processor, memory coupled with the processor, and instructions stored in the memory. The instructions may be executable by the processor to cause the apparatus to identify a window including a set of PRS transmission opportunities for a channel, perform a channel access procedure to access the channel for transmission of a positioning reference signal during the window, determine at least a subset of the set of PRS transmission opportunities that are remaining in the window subsequent to obtaining access to the channel during the window as a result of the channel access procedure, and transmit a PRS during one or more of the at least the subset of the set of PRS transmission opportunities that are remaining in the window.

Another apparatus for wireless communication is described. The apparatus may include means for identifying a window including a set of PRS transmission opportunities for a channel, performing a channel access procedure to access the channel for transmission of a positioning reference signal during the window, determining at least a subset of the set of PRS transmission opportunities that are remaining in the window subsequent to obtaining access to the channel during the window as a result of the channel access procedure, and transmitting a PRS during one or more of the at least the subset of the set of PRS transmission opportunities that are remaining in the window.

A non-transitory computer-readable medium storing code for wireless communication is described. The code may include instructions executable by a processor to identify a window including a set of PRS transmission opportunities for a channel, perform a channel access procedure to access the channel for transmission of a positioning reference signal during the window, determine at least a subset of the set of PRS transmission opportunities that are remaining in the window subsequent to obtaining access to the channel during the window as a result of the channel access procedure, and transmit a PRS during one or more of the at least the subset of the set of PRS transmission opportunities that are remaining in the window.

Some examples of the method, apparatuses, and non-transitory computer-readable medium described herein may further include operations, features, means, or instructions for determining a portion of a PRS transmission opportunity remaining in the window subsequent to obtaining access to the channel during the window as a result of the channel access procedure, and refraining from transmitting the PRS during the portion of the PRS transmission opportunity.

In some cases of the method, apparatuses, and non-transitory computer-readable medium described herein, transmitting the PRS during the one or more of the at least the subset of the set of PRS transmission opportunities further may include operations, features, means, or instructions for transmitting the PRS during a first PRS transmission opportunity of the at least the subset of the set of PRS transmission opportunities, and transmitting the PRS during a second PRS transmission opportunity of the at least the subset of the set of PRS transmission opportunities.

In some cases of the method, apparatuses, and non-transitory computer-readable medium described herein, each of the set of PRS transmission opportunities occur consecutively within the window.

In some cases of the method, apparatuses, and non-transitory computer-readable medium described herein, a portion of a first transmission opportunity of the set of PRS transmission opportunities occurs at a same time as a portion of a second transmission opportunity of the set of PRS transmission opportunities.

Some examples of the method, apparatuses, and non-transitory computer-readable medium described herein may further include operations, features, means, or instructions for determining a quantity of PRSs to transmit during the window, determining that a quantity of the at least the subset of the set of PRS transmission opportunities remaining in the window subsequent to obtaining access to the channel exceeds the quantity of PRSs to transmit during the window, transmitting the quantity of PRSs within consecutive PRS transmission opportunities of the at least the subset of the set of PRS transmission opportunities, and refraining from transmitting the PRS after transmitting the quantity of PRSs within a remaining quantity of the at least the subset of the set of PRS transmission opportunities within the window.

Some examples of the method, apparatuses, and non-transitory computer-readable medium described herein may further include operations, features, means, or instructions for determining a first quantity of PRSs to transmit during the window, determining that a second quantity of the at least the subset of the set of PRS transmission opportunities remaining in the window subsequent to obtaining access to the channel may be less than the first quantity of PRSs to transmit during the window, and transmitting the second quantity of PRSs over the at least the subset of the set of PRS transmission opportunities remaining in the window.

In some cases of the method, apparatuses, and non-transitory computer-readable medium described herein, the PRS may be a first PRS, and where the window includes the set of PRS transmission opportunities for transmitting the first PRS via a first beam.

Some examples of the method, apparatuses, and non-transitory computer-readable medium described herein may further include operations, features, means, or instructions for identifying a second window including a second set of PRS transmission opportunities for transmitting the PRS via a second beam.

In some cases of the method, apparatuses, and non-transitory computer-readable medium described herein, the PRS may be a first PRS, a first PRS transmission opportunity of the set of PRS transmission opportunities may be for transmitting the first PRS via a first beam, and a second PRS transmission opportunity of the set of PRS transmission opportunities may be for transmitting a second PRS via a second beam.

In some cases of the method, apparatuses, and non-transitory computer-readable medium described herein, performing the channel access procedure further may include operations, features, means, or instructions for performing a first channel access procedure via a first beam and gaining access to the channel via the first beam, and performing a second channel access procedure by a second beam and gaining access to the channel via the second beam, where transmitting the PRS during may be based on gaining access to the channel via the first beam and gaining access to the channel via the second beam.

In some cases of the method, apparatuses, and non-transitory computer-readable medium described herein, performing the channel access procedure further may include operations, features, means, or instructions for performing a first channel access procedure via a first beam and gaining access to the channel via the first beam, and performing a second channel access procedure by a second beam and failing to gain access to the channel via the second beam, where transmitting the PRS further includes transmitting the PRS via the first beam and refraining from transmitting the PRS via the second beam.

In some cases of the method, apparatuses, and non-transitory computer-readable medium described herein, performing the channel access procedure further may include operations, features, means, or instructions for performing a first channel access procedure to access the channel during a first PRS transmission opportunity of the set of PRS transmission opportunities by a set of beams, determining a channel access failure for at least one of the set of beams based on performing the first channel access procedure, refraining from transmitting a PRS during the PRS transmission opportunity based on determining the channel access failure, performing a second channel access procedure to access the channel during a second PRS transmission opportunity of the set of PRS transmission opportunities, and gaining access to the channel for each of the set of beams during the second PRS transmission opportunity, where transmitting the PRS may be based on gaining access to the channel.

Some examples of the method, apparatuses, and non-transitory computer-readable medium described herein may further include operations, features, means, or instructions for determining a first quantity of symbols spanning a first PRS transmission opportunity of the one or more PRS transmission opportunities, determining a first comb spacing parameter associated with the first PRS transmission opportunity, the first comb spacing parameter indicating a quantity of REs between each resource element (RE) occupied by the PRS, and mapping the PRS to a first quantity of REs within the first quantity of symbols of the first PRS transmission opportunity according to the first comb spacing parameter, where transmitting the PRS may be based on mapping the PRS to the first quantity of REs within the first quantity of symbols.

Some examples of the method, apparatuses, and non-transitory computer-readable medium described herein may further include operations, features, means, or instructions for determining a second quantity of symbols spanning a second PRS transmission opportunity of the one or more PRS transmission opportunities, the second quantity of symbols different than the first quantity of symbols, determining a second comb spacing parameter associated with the second PRS transmission opportunity, and mapping the PRS to a second quantity of REs within the second quantity of symbols spanning the second PRS transmission opportunity according to the second comb spacing parameter, where transmitting the PRS may be based on mapping the PRS to the second quantity of REs within the second quantity of symbols.

In some cases of the method, apparatuses, and non-transitory computer-readable medium described herein, mapping the PRS to the quantity of REs within the first quantity of symbols spanning the first PRS transmission opportunity further may include operations, features, means, or instructions for mapping the PRS to different set of REs within a first symbol of the first quantity of symbols and a second symbol of the first quantity of symbols.

Some examples of the method, apparatuses, and non-transitory computer-readable medium described herein may further include operations, features, means, or instructions for determining an RE offset indicating a position of a first RE of the quantity of REs within a first symbol of the first quantity of symbols, where mapping the PRS to the quantity of REs within the first quantity of symbols may be based on the RE offset.

A method of wireless communication is described. The method may include identifying a window for receiving a PRS via a channel associated with channel access procedures, the window including a set of PRS transmission opportunities within the window, monitoring one or more of the set of PRS transmission opportunities during the window for the PRS, and detecting the PRS within at least one of the one or more of the set of PRS transmission opportunities based on monitoring the one or more of the set of PRS transmission opportunities.

An apparatus for wireless communication is described. The apparatus may include a processor, memory coupled with the processor, and instructions stored in the memory. The instructions may be executable by the processor to cause the apparatus to identify a window for receiving a PRS via a channel associated with channel access procedures, the window including a set of PRS transmission opportunities within the window, monitor one or more of the set of PRS transmission opportunities during the window for the PRS, and detect the PRS within at least one of the one or more of the set of PRS transmission opportunities based on monitoring the one or more of the set of PRS transmission opportunities.

Another apparatus for wireless communication is described. The apparatus may include means for identifying a window for receiving a PRS via a channel associated with channel access procedures, the window including a set of PRS transmission opportunities within the window, monitoring one or more of the set of PRS transmission opportunities during the window for the PRS, and detecting the PRS within at least one of the one or more of the set of PRS transmission opportunities based on monitoring the one or more of the set of PRS transmission opportunities.

A non-transitory computer-readable medium storing code for wireless communication is described. The code may include instructions executable by a processor to identify a window for receiving a PRS via a channel associated with channel access procedures, the window including a set of PRS transmission opportunities within the window, monitor one or more of the set of PRS transmission opportunities during the window for the PRS, and detect the PRS within at least one of the one or more of the set of PRS transmission opportunities based on monitoring the one or more of the set of PRS transmission opportunities.

Some examples of the method, apparatuses, and non-transitory computer-readable medium described herein may further include operations, features, means, or instructions for determining a maximum quantity of PRSs to be received within the window, determining, after monitoring at least a subset of the one or more of the set of PRS transmission opportunities, that the maximum quantity of PRSs may have been received, and refraining from monitoring a remaining quantity of PRS transmission opportunities within the window based on determining that the maximum quantity of PRSs may have been received.

In some cases of the method, apparatuses, and non-transitory computer-readable medium described herein, detecting the PRS within the one or more of the set of PRS transmission opportunities further may include operations, features, means, or instructions for detecting the PRS during a first PRS transmission opportunity of the set of PRS transmission opportunities, and detecting the PRS during a second PRS transmission opportunity of the set of PRS transmission opportunities.

In some cases of the method, apparatuses, and non-transitory computer-readable medium described herein, each of the set of PRS transmission opportunities occur consecutively within the window.

In some cases of the method, apparatuses, and non-transitory computer-readable medium described herein, a portion of a first transmission opportunity of the set of PRS transmission opportunities occurs at a same time as a portion of a second transmission opportunity of the set of PRS transmission opportunities.

In some cases of the method, apparatuses, and non-transitory computer-readable medium described herein, each of the set of PRS transmissions may be associated with a first beam and occur nonconsecutively within the window.

Some examples of the method, apparatuses, and non-transitory computer-readable medium described herein may further include operations, features, means, or instructions for determining a first quantity of symbols spanning a first PRS transmission opportunity of the one or more of the set of PRS transmission opportunities, determining a first comb spacing parameter associated with the first PRS transmission opportunity, the first comb spacing parameter indicating a quantity of REs between each RE inhabited by the PRS, and monitoring a first quantity of REs within the first quantity of symbols of the first PRS transmission opportunity according to the first comb spacing parameter, where detecting the PRS may be based on monitoring the first quantity of REs within the first quantity of symbols.

Some examples of the method, apparatuses, and non-transitory computer-readable medium described herein may further include operations, features, means, or instructions for determining a second quantity of symbols spanning a second PRS transmission opportunity of the one or more of the set of PRS transmission opportunities, the second quantity of symbols different than the first quantity of symbols, determining a second comb spacing parameter associated with the second PRS transmission opportunity, monitoring a second quantity of REs within the second quantity of symbols spanning the second PRS transmission opportunity according to the second comb spacing parameter, and detecting a second PRS based on monitoring the second quantity of REs within the second quantity of symbols.

In some cases of the method, apparatuses, and non-transitory computer-readable medium described herein, monitoring the quantity of REs within the first quantity of symbols spanning the first PRS transmission opportunity further may include operations, features, means, or instructions for monitoring different sets of REs within a first symbol of the first quantity of symbols and a second symbol of the first quantity of symbols.

In some cases of the method, apparatuses, and non-transitory computer-readable medium described herein, monitoring the quantity of REs within the first quantity of symbols spanning the first PRS transmission opportunity further may include operations, features, means, or instructions for monitoring a same set of REs within each symbol of the first quantity of symbols.

Some examples of the method, apparatuses, and non-transitory computer-readable medium described herein may further include operations, features, means, or instructions for determining an RE offset indicating a position of a first RE of the quantity of REs within a first symbol of the first quantity of symbols, where monitoring the quantity of REs within the first quantity of symbols may be based on the RE offset.

BRIEF DESCRIPTION OF THE DRAWINGS

FIGS. 6A through 7B illustrate an examples of positioning reference signal (PRS) block configurations that support a window for transmitting a positioning reference signal in accordance with aspects of the present disclosure.

DETAILED DESCRIPTION

Figure 1:
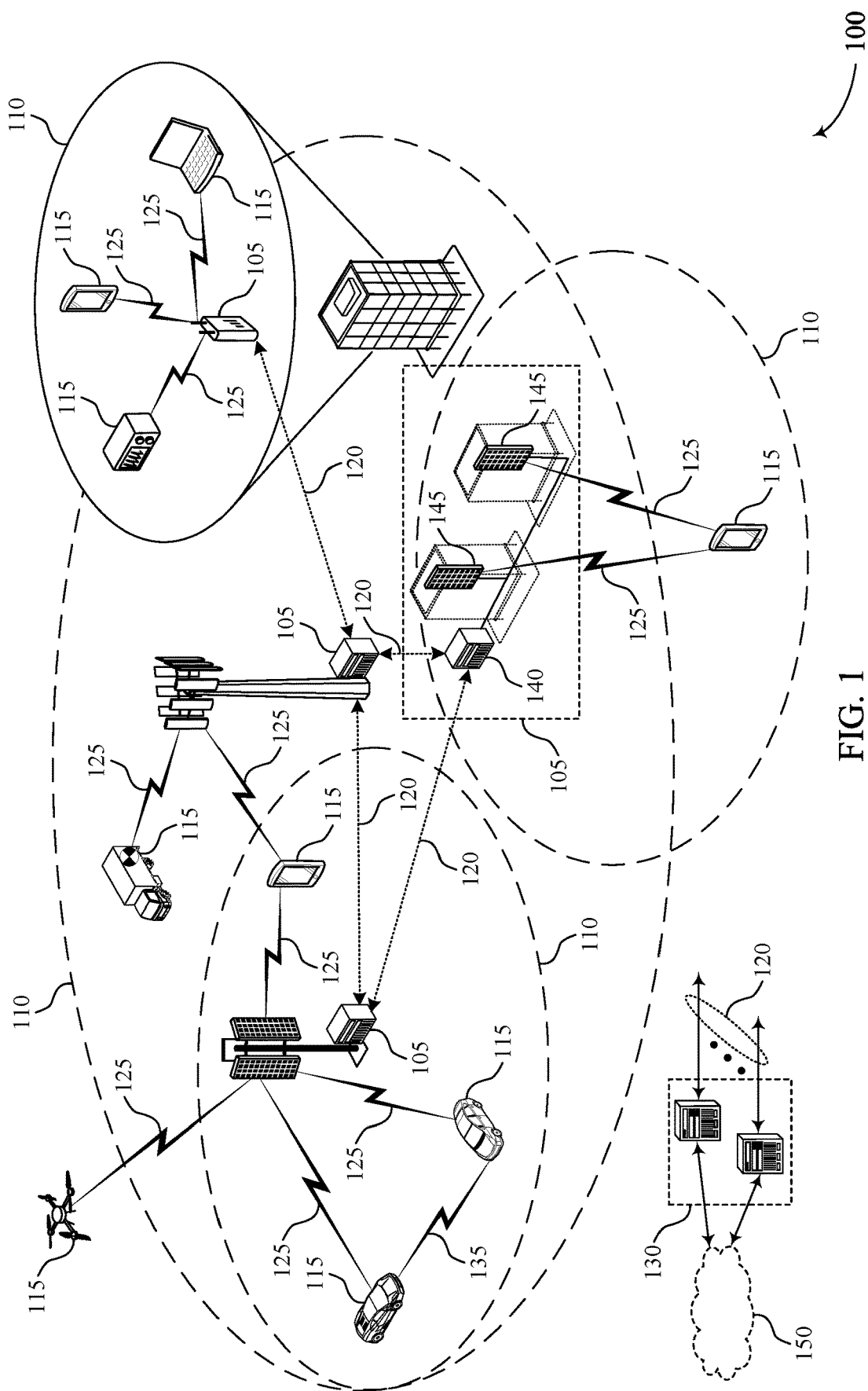
FIG. 1 illustrates an example of a system for wireless communication that supports a window for transmitting a positioning reference signal in accordance with aspects of the present disclosure.

In some wireless communications systems, a wireless device may estimate (determine, identify) its position or geographic location (e.g., to use for navigation). Accordingly, in such systems, a first wireless device (e.g., a base station) may periodically transmit a positioning reference signal (PRS) to a second wireless device (e.g., a user equipment (UE)). The second wireless device may perform measurements on PRSs received from the first wireless device (e.g., determining the time of arrival, doppler estimation) to estimate its position or geographic location (e.g., the position or geographic location of the second wireless device relative to the first wireless device). When the first wireless device is transmitting the periodic PRS to the second wireless device over a channel within an unlicensed spectrum, the first wireless device may need to gain access to the channel prior to transmitting a PRS over the channel. In some cases, the first wireless device may fail to reliably gain access to the channel and fail to transmit the PRS transmission.

In some aspects, if the first wireless device is transmitting the PRS over a channel within the unlicensed spectrum, the first wireless device may extend the periodic PRS transmission to a periodic window for transmitting one or more PRS transmissions. Each window may include multiple PRS transmission opportunities on the channel. As a result, if the first wireless device fails to gain access to the channel during a first PRS transmission opportunity, the wireless device may transmit a PRS transmission during a subsequent PRS transmission opportunity. Each transmission opportunity may correspond to a potential opportunity (e.g., if the first wireless device gains access to the channel) for the first wireless device to transmit a PRS signal over a PRS block. Each PRS block may span a quantity of symbols (e.g., one, two, three, four, six, eight, twelve, 24) and have an associated comb spacing parameter (e.g., a PRS symbol every two resource elements (REs), every four REs, every six REs). During the window, the first device may attempt to gain access to the channel and, in some cases, transmit one or more PRSs and the second device may monitor one or more PRS transmission opportunities within the window.

When the window begins (or just before the window begins), the first wireless device may perform the channel access procedure to obtain access to the channel. For example, the first wireless device may perform a listen-before-talk (LBT) procedure, which may include a backoff window if contention occurs. If the first wireless device gains access to the channel at some point during the window, the first wireless device may determine that a subset of the PRS transmission opportunities are remaining within the window. The first wireless device may transmit one or more PRS transmissions during one or more of the subset of remaining PRS transmission opportunities. In some cases, the first wireless device may gain access to the channel and determine that there is a portion of a PRS transmission opportunity remaining within the window. For instance, the first wireless device may gain access to the channel part way through a PRS transmission opportunity. Here, the device may refrain from transmitting a PRS during the portion of the PRS transmission opportunity.

Aspects of the disclosure are initially described in the context of wireless communications systems. Aspects of the disclosure are then described in the context of window configurations, PRS block configurations, and a process flow. Aspects of the disclosure are further illustrated by and described with reference to apparatus diagrams, system diagrams, and flowcharts that relate to window for transmitting a positioning reference signal.

FIG. 1 illustrates an example of a wireless communications system 100 that supports window for transmitting a positioning reference signal in accordance with aspects of the present disclosure. The wireless communications system 100 may include one or more base stations 105, one or more UEs 115, and a core network 130. In some cases, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some cases, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some cases, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some aspects the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some cases, the wireless communications system 100 may include base stations 105 or UEs 115 that support simultaneous communications via carriers associated with multiple carrier bandwidths. In some cases, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some cases, a base station 105 may be movable and therefore provide communication coverage for a moving geographic coverage area 110. In some cases, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of the UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. For example, the unlicensed radio frequency spectrum may be subject to regulatory requirements for channel access according to a channel access procedure that utilizes carrier sensing such as an LBT channel access procedure (e.g., contention-based channels). Unlicensed or shared radio frequency spectrum bands may include unlicensed bands, or bands that are used opportunistically by some devices (e.g., bands that are shared between multiple operators, or licensed to one operator with opportunistic access by other devices). In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some cases, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some cases, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

In wireless communications system 100, a wireless device (e.g., a UE 115) may be configured to identify its position or geographic location (e.g., to use for navigation) based on receiving a PRS from a base station 105 (e.g., using a time of arrival or doppler estimation on the PRS). For instance, a base station 105 may transmit a PRS over a channel within the unlicensed spectrum to the UE 115. The UE 115 may determine a window including multiple PRS transmission opportunities and monitor one or more of the PRS transmission opportunities for a PRS transmission from the base station 105. The base station 105 may also identify the window including the multiple PRS transmission opportunities. During or just before the window, the base station 105 may perform a channel access procedure (e.g., LBT) to gain access to the channel. If the base station 105 gains access to the channel during the window, the base station 105 may determine whether there are any full PRS transmission opportunities remaining within the window. If there are remaining PRS transmission opportunities, the base station 105 may transmit one or more PRSs to the UE 115. In some cases, the base station 105 may gain access to the channel and determine that there is a portion of a PRS transmission opportunity remaining in the window. Here, the base station 105 may refrain from transmitting, to the UE 115, a PRS transmission during the portion of the PRS transmission opportunity.

Figure 2:
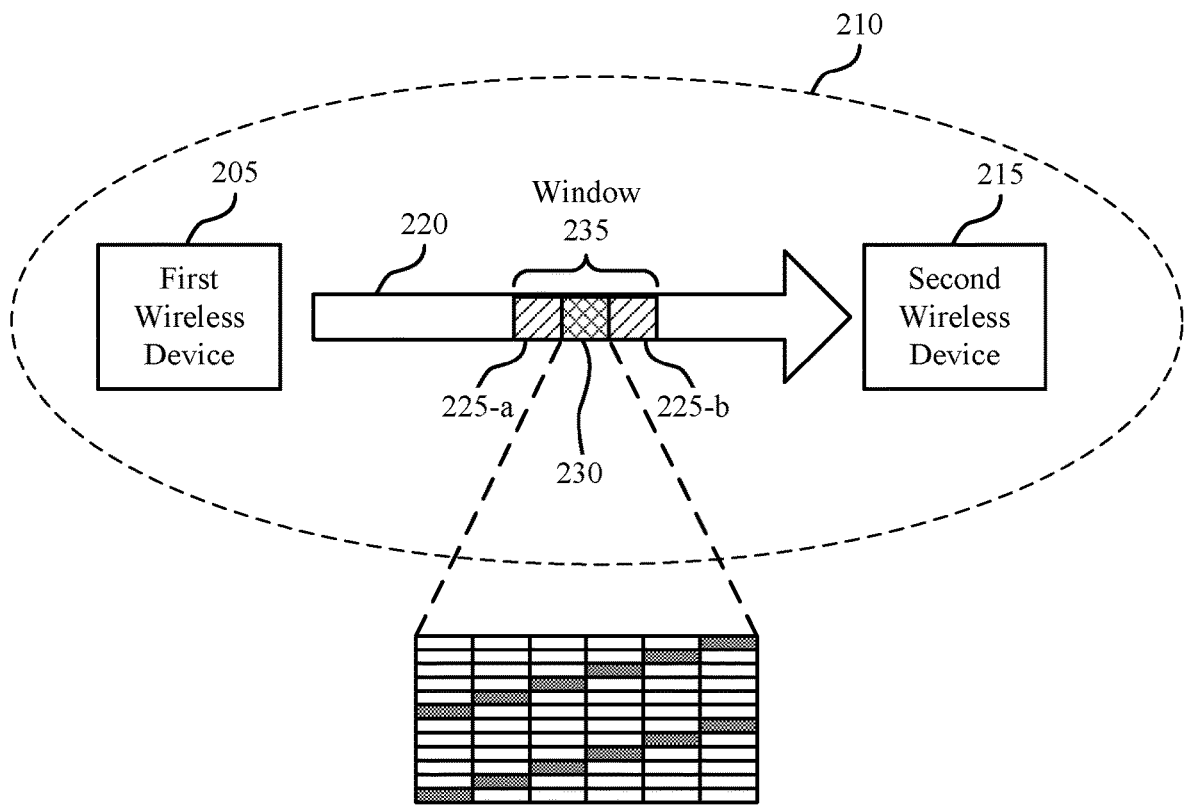
FIG. 2 illustrates an example of a system for wireless communication that supports window for transmitting a positioning reference signal in accordance with aspects of the present disclosure.

FIG. 2 illustrates an example of a wireless communications system 200 that supports a window for transmitting a PRS in accordance with various aspects of the present disclosure. Wireless communications system 200 may implement aspects of wireless communications system 100. For instance, wireless communications system 200 may include a first wireless device 205, which may include aspects of base stations 105. Further, wireless communications system 200 may include a second wireless device 215, which may include aspects of UEs 115. The wireless communications system 200 may also include a geographic coverage area 210 which may include features described with reference to geographic coverage areas 110 within FIG. 1. As described above, the first wireless device 205 may transmit a PRS transmission to the second wireless device 215 within the window 235. For instance, the first wireless device 205 may transmit the PRS transmission over the channel 220.

The first wireless device 205 and the second wireless device 215 may each identify the window 235. In some cases, the window 235 may be preconfigured. In one aspect of the preconfigured window 235, the window 235 may be preprogrammed at first wireless device 205 and second wireless device 215 upon deployment. In another aspect of the preconfigured window 235, the window 235 may be signaled to one or both of the first wireless device 205 and the second wireless device 215. The window 235 may be referenced according to a frame timing synchronized to other signals (e.g., synchronization signals transmitted by the first wireless device 205 over other licensed or unlicensed carriers, global positioning system (GPS) time). The window 235 may be a periodic PRS window 235 for the first wireless device 205 to periodically transmit a PRS transmission to the second wireless device 215. The second wireless device 215 may receive the PRS and, based on receiving the PRS, determine a location of the second wireless device 215 (e.g., relative to a known location of the first wireless device 205).

The window 235 may include multiple PRS transmission opportunities 225. Here, the window 235 may include three distinct PRS transmission opportunities 225: a first PRS transmission opportunity 225-a, a second PRS transmission opportunity (e.g., during which PRS block 230 is transmitted), and a third PRS transmission opportunity 225-b. Although not illustrated, a PRS window 235 may include a different number of PRS transmission opportunities (e.g., two, four, five or more). Each PRS transmission opportunity 225 may correspond to a set of resources over channel 220 for a first wireless device 205 to transmit a PRS block 230. The set of resources may span a quantity of resources (e.g., a given number of OFDM symbols and a given number of subcarriers). In some cases, each PRS transmission opportunity 225 within a window 235 may include a same quantity of resources. In some other cases, each PRS transmission opportunity 225 may include a different number of resources. The PRS transmission opportunities 225 may or may not be overlapping. Further, the PRS transmission opportunities may be specific to a single beam used by the first wireless device 205 for configuration. For instance, each of the PRS transmission opportunities 225 may be PRS transmission opportunities 225 for the first wireless device 205 to transmit a PRS block 230 via a specific beam.

The second wireless device 215 may identify the window 235 and monitor for one or more PRS blocks 230 within the window 235. The second wireless device 215 may monitor for PRS blocks according to a PRS transmission opportunity 225 granularity. For instance, the second wireless device 215 may monitor a beginning of PRS transmission opportunity 225-a and fail to detect a PRS block 230 within the PRS transmission opportunity 225-a and refrain from monitoring the remaining portion of the PRS transmission opportunity 225-a. In some cases, the second wireless device 215 may detect PRS blocks 230 that are transmitted within the PRS transmission opportunity 225 based on the monitoring. The second wireless device 215 may receive PRS blocks 230 from a serving first wireless device 215 or a different first wireless device 215 other than a serving first wireless device 215.

At or just before a beginning of the window 235, the first wireless device 205 may perform a channel access procedure. That is, the channel 220 may be a contention-based channel. In some aspects of the channel access procedure, the first wireless device 205 may perform a listen-before-talk (LBT) procedure. Here, the first wireless device 205 may only obtain access to the channel 220 if the first wireless device 205 determines that the channel 220 is idle (e.g., by performing a clear channel assessment (CCA)). If the first wireless device 205 determines that the channel 220 is clear, the first wireless device 205 may obtain access to the channel 220 during the window 235. For instance, if the first wireless device 205 performs a channel access procedure at the beginning of the window 235, the base station may gain access to the channel 220 during the first PRS transmission opportunity 225.

Once the first wireless device 205 gains access to the channel 220, the first wireless device 205 may determine a quantity of PRS transmission opportunities 225 remaining within the window 235. Here, if the first wireless device 205 gains access to the channel 220 during the PRS transmission opportunity 225-a (after the start of PRS transmission opportunity 225-a), the first wireless device 205 may determine there are two remaining PRS transmission opportunities 225. In another case, if the first wireless device 205 gains access to the channel 220 at a beginning of the window 235, the first wireless device 205 may determine there are three remaining PRS transmission opportunities 225 within the window 235. Based on determining that there are one or more PRS transmission opportunities 225 remaining within the window 235, the first wireless device 205 may transmit one or more PRS to the second wireless device 215. For instance, the first wireless device 205 may determine, after gaining access to the channel 220 within the first PRS transmission opportunity 225-a, to transmit the PRS within the PRS block 230 (e.g., during the second PRS transmission opportunity). In some other cases, the first wireless device 205 may determine to transmit more than one PRS (e.g., within more than one PRS transmission opportunity 225).

In some instances, the first wireless device 205 may gain access to the channel 220 and determine that there is a portion of a PRS transmission opportunity 225 within the remaining PRS transmission opportunities 225. In one case, the first wireless device 205 may gain access to the channel 220 during the PRS transmission opportunity 225-a and determine that there is only a portion of the PRS transmission opportunity 225-a within the remaining PRS transmission opportunities 225. In another case, the first wireless device 205 may gain access to the channel 220 during the final PRS transmission opportunity 225-b within the window 235. In either case, the first wireless device 205 may refrain from transmitting a PRS during a portion of a PRS transmission opportunity 225. That is, the first wireless device 205 may transmit an entire PRS block 230 (e.g., spanning a PRS transmission opportunity 225) or refrain from transmitting any PRS within the PRS transmission opportunity 225.

The PRS block 230 may span a PRS transmission opportunity and may include a set of PRS REs mapped to the resources within the PRS block 230 according to a known configuration. That is, the configuration of each PRS block 230 (e.g., corresponding to a configuration of each PRS transmission opportunity 225) may be preconfigured or signaled to one or both of the second wireless device 215 and the first wireless device 205. The configuration may indicate a quantity of symbols within the PRS block 230. In the case of PRS block 230, the PRS block 230 may be configured to span six symbols. The configuration may also indicate a comb spacing parameter corresponding to a number of REs between each PRS mapped to a symbol. Here, the comb spacing parameter may indicate for the first wireless device 205 to map a PRS RE to every sixth RE within the PRS block 230.

Figure 3A:
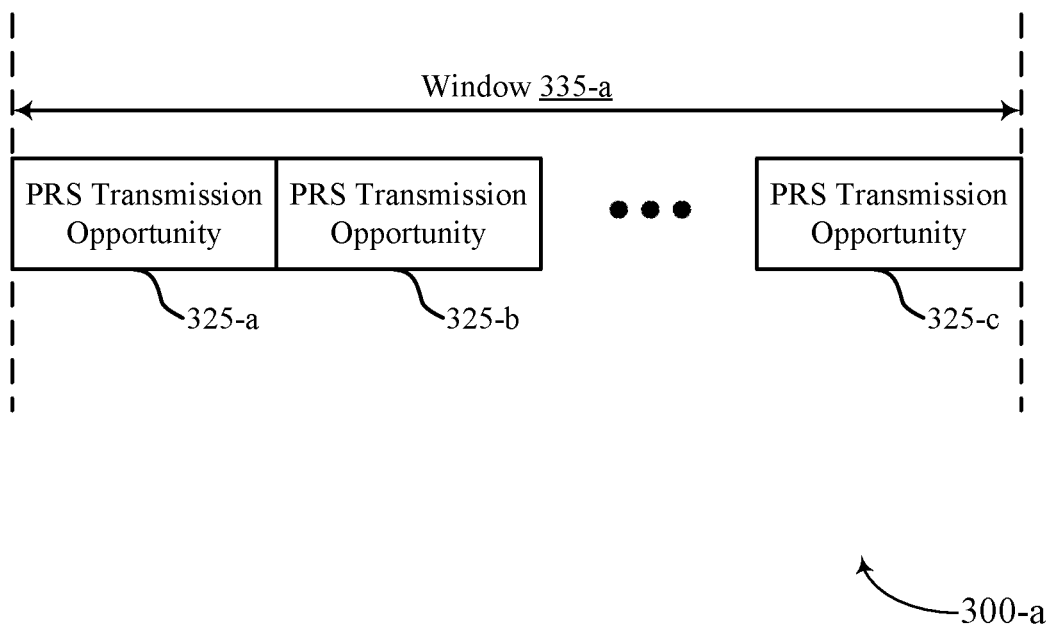
FIGS. 3A through 5B illustrate example window configurations that support a window for transmitting a positioning reference signal in accordance with aspects of the present disclosure.
Figure 3B:
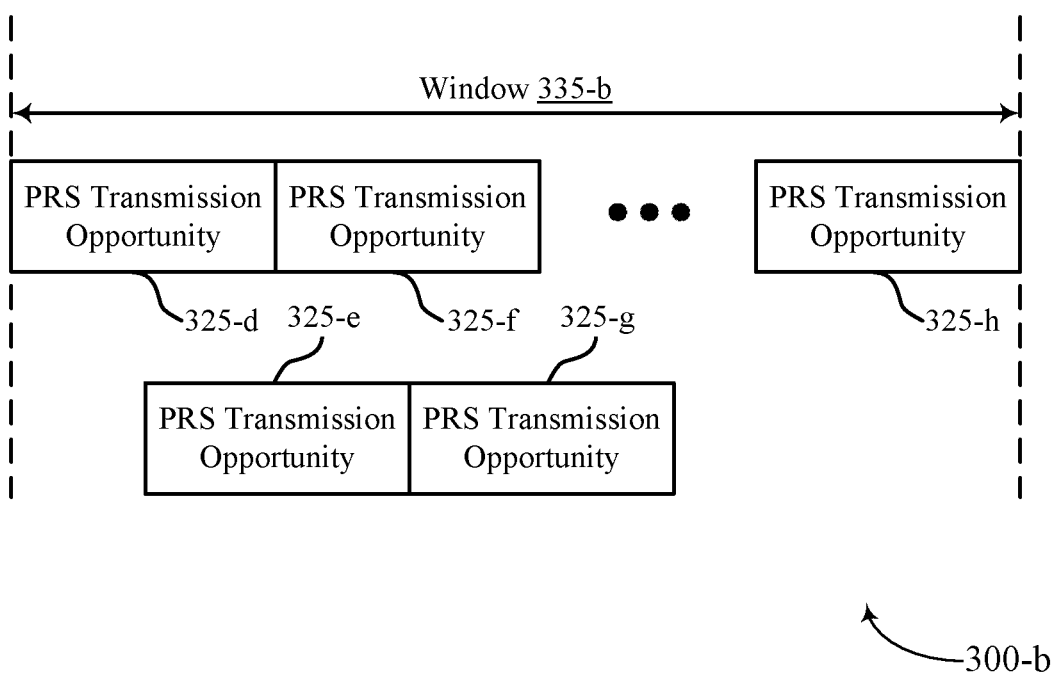

FIGS. 3A and 3B illustrate window configurations 300 support a window for transmitting a PRS in accordance with various aspects of the present disclosure. The window configurations 300 may indicate a configuration for windows 335. The windows 335 may be instances of the window 235 as described with reference to FIG. 2. In some cases, the windows 335 may be preconfigured to enable a first wireless device (e.g., first wireless device 205 as described with reference to FIG. 2) to periodically transmit one or more PRSs to a second wireless device (e.g. second wireless device 215 as described with reference to FIG. 2). The window configurations 300 may indicate a configuration for the PRS transmission opportunities 325. That is, the windows 335 may include multiple PRS transmission opportunities 325 and the window configurations 300 may indicate different parameters associated with each of the PRS transmission opportunities 325. Each PRS transmission opportunity 325 may be synchronized to a frame timing determined, for example, from a synchronization signal transmitted by the base station over a licensed or unlicensed channel, or from a different timing source (e.g., GPS time). Window configuration 300-a may illustrate a window configuration 300 where the PRS transmission opportunities 325 are non-overlapping while window configuration 300-b may illustrate a window configuration 300 where the PRS transmission opportunities 325 are overlapping (e.g., in time).

Each of the window configurations 300 may be preconfigured and known by both the first wireless device and the second wireless device. During the windows 335, the first wireless device may perform a channel access procedure to obtain access to a channel for transmitting a PRS block (e.g., a PRS block 230 as described with reference to FIG. 2) within one or more of the PRS transmission opportunities 325. Once the first wireless device gains access to the channel, the first wireless device may transmit one or more PRS blocks within one or more corresponding PRS transmission opportunities 325. The second wireless device may begin monitoring for a PRS block at the beginning of the windows 335. The second wireless device may monitor for PRS blocks according to a PRS transmission opportunity 325 granularity.

FIG. 3A illustrates a window configuration 300-a where the PRS transmission opportunities 325 within the window 335-a do not overlap (e.g., do not overlap in time). That is, each of the PRS transmission opportunities 325-a, 325-b, and 325-c may occur sequentially. For instance, PRS transmission opportunity 325-a may correspond to a first set of symbols and PRS transmission opportunity 325-b may correspond to a second set of symbols following the first set symbols for PRS transmission opportunity 325-a. In the case of non-overlapping PRS transmission opportunities 325, the PRS sequence generation and sequence mapping may be the same for a PRS block transmitted within any of the PRS transmission opportunities 325. For instance, the first wireless device may map PRS REs to the same set of resources within PRS transmission opportunity 325-b and PRS transmission opportunity 325-c. Alternatively, the PRS sequence generation and sequence mapping may be different for different PRS blocks transmitted within different PRS transmission opportunities 325. For instance, the first wireless device may map PRS REs to a set of resources within each PRS transmission opportunity 325 dependent on an index of the PRS transmission opportunity 325. In either case, both the first wireless device and the second wireless device may know the configuration and sequence mapping for each of the PRS transmission opportunities 325 within the window 335.

FIG. 3B illustrates a window configuration 300-b where the PRS transmission opportunities 325 within the window 335-b do overlap. For instance, PRS transmission opportunity 325-d and 325-e may each include a quantity of overlapping symbols. Each of the PRS transmission opportunities 325-d, 325-e, 325-f, 325-g, and 325-h may include resources within a same channel or carrier. The PRS sequence generation and sequence mapping may be the same for a PRS block transmitted within any of the PRS transmission opportunities 325. For instance, the first wireless device may map PRS REs to the same set of resources within PRS transmission opportunity 325-f and PRS transmission opportunity 325-g. Alternatively, the PRS sequence generation and sequence mapping may be different for different PRS blocks transmitted within different PRS transmission opportunities 325. For instance, the first wireless device may map PRS REs to a set of resources within each PRS transmission opportunity 325 dependent on an index of the PRS transmission opportunity 325 (e.g., a comb spacing, comb offset, or number of symbols may be different, and may depend on the index). In either case, both the first wireless device and the second wireless device may know the configuration and sequence mapping for each of the PRS transmission opportunities 325 within the window 335.

Figure 4A:
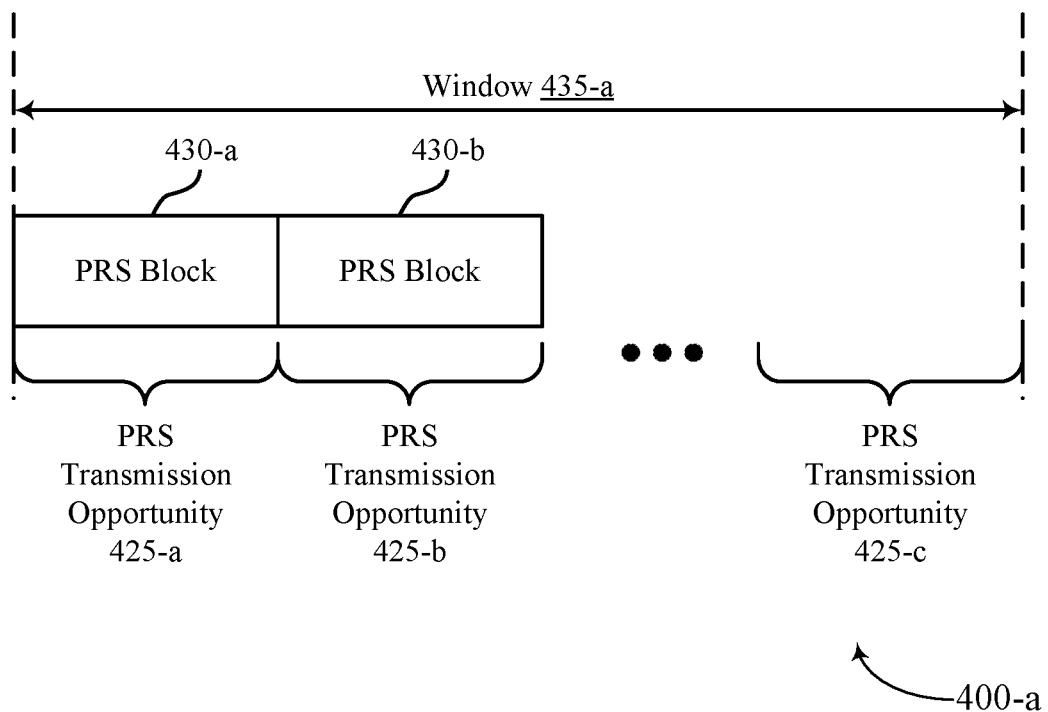
Figure 4B:
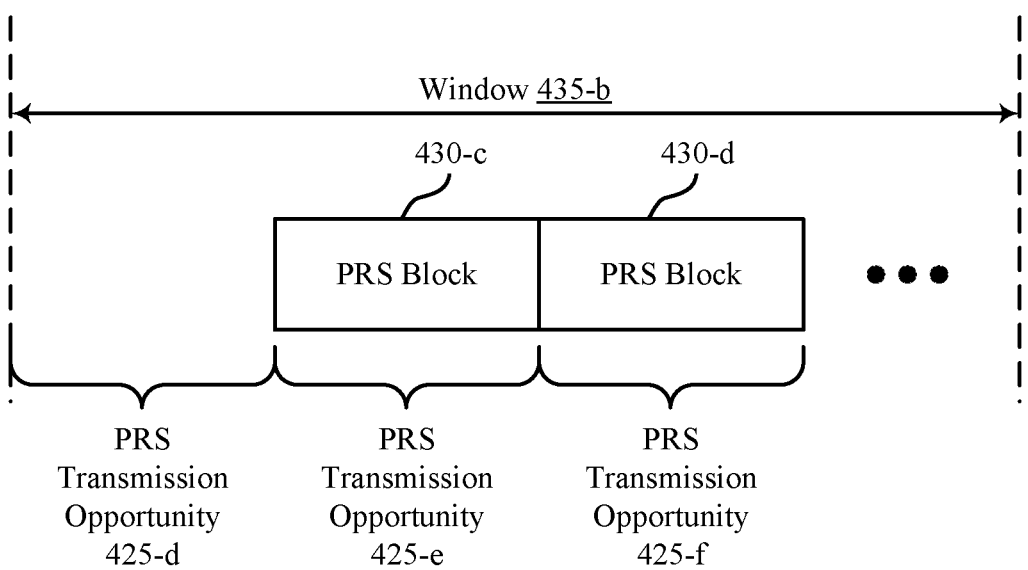

FIGS. 4A and 4B illustrate an example of window configurations 400 that support a window for transmitting a PRS in accordance with various aspects of the present disclosure. The window configurations 400 may indicate a configuration for windows 435. The windows 435 may be instances of the window 235 as described with reference to FIG. 2 or windows 335 as described with reference to FIG. 3. In some cases, the windows 435 may be preconfigured to enable a first wireless device (e.g., first wireless device 205 as described with reference to FIG. 2) to periodically transmit one or more PRSs to a second wireless device (e.g. second wireless device 215 as described with reference to FIG. 2). The window configurations 400 may indicate a configuration for the PRS transmission opportunities 425. Each PRS transmission opportunity 425 may be synchronized to a frame timing determined, for example, from a synchronization signal transmitted by the base station over a licensed or unlicensed channel, or from a different timing source (e.g., GPS time). That is, the windows 435 may include multiple PRS transmission opportunities 425 and the window configurations 400 may indicate different parameters associated with each of the PRS transmission opportunities 425.

Each of the window configurations 400 may be preconfigured and known by both the first wireless device and the second wireless device. During the windows 435, the first wireless device may perform a channel access procedure to obtain access to a channel for transmitting a PRS block 430 within one or more of the PRS transmission opportunities 425. Once the first wireless device gains access to the channel, the first wireless device may transmit one or more PRS blocks 430 within one or more corresponding PRS transmission opportunities 425. The second wireless device may begin monitoring for a PRS block at the beginning of the windows 435. The second wireless device may monitor for PRS blocks 430 according to a PRS transmission opportunity 425 granularity.

Within each of the window configurations 400, the window configurations 400 may allow for multiple PRS block 430 transmissions. In some cases, the PRS block transmissions 430 may occur over a channel subject to interference (e.g., within an unlicensed spectrum). Increasing a number of PRS block transmissions 430 within each window 435 may increase a likelihood that the second wireless device successfully detects and decodes the transmission of the PRS blocks 430. The window configurations 400 may indicate a maximum number of consecutive PRS block 430 transmissions within the window 435. Once the first wireless device gains access to the channel (e.g., after performing a channel access procedure), the first wireless device may transmit the maximum number of PRS block 430 transmissions consecutively within the window 435. In some cases, the first wireless device may transmit less than the maximum number of PRS block 430 transmissions within the window 435. That is, the first wireless device may gain access to the channel and determine that the number of remaining PRS transmission opportunities 425 within the window 435 is less than the maximum number of PRS block 430 transmissions. Here, the first wireless device may transmit a PRS block 430 transmission within each of the remaining PRS transmission opportunities 425.

The second wireless device may monitor the windows 435 according to the maximum number of consecutive PRS block 430 transmissions. That is, if the maximum number of consecutive PRS block 430 transmissions within a window 435 is one, after the second wireless device detects a first PRS block 430 transmission within a PRS transmission opportunity 425, the second wireless device may refrain from monitoring the remaining PRS transmission opportunities 425 within the window 435.

Window configuration 400-a may illustrate a window configuration 400-a where the first wireless device obtains access to the channel and transmits a PRS block 430-a during a first PRS transmission opportunity 425-a. Window configuration 400-b may illustrate a window configuration 400-b where the first wireless device fails to obtain access to the channel during the first PRS transmission opportunity 425-d.

FIG. 4A illustrates a window configuration 400-a configured to allow multiple PRS block 430 transmissions within the window 435-a. The first wireless device may perform a channel access procedure and gain access to the channel and determine that each of the PRS transmission opportunities 425 within the window 435-a remain in the window 435-a. The first wireless device may transmit the PRS block 430-a within the first PRS transmission opportunity 425-a. Because the window 435-a is configured to allow multiple PRS block 430 transmissions, the wireless device may maintain access to the channel in the following PRS transmission opportunity 425-b and transmit the PRS block 430-b. In some cases, the window 435-a may be configured for a maximum number (e.g., two) consecutive PRS block 430 transmissions. Here, the first wireless device may refrain from transmitting a PRS block 430 in the remaining PRS transmission opportunities 425 (e.g., within PRS transmission opportunity 425-c). In some other cases, the window 435-a may be configured to allow more than two consecutive PRS block 430 transmissions. Here, the first wireless device may continue to transmit PRS blocks 430 until it has transmitted the maximum number of PRS blocks 430 within the window 435-a, or the end of the window 435-a is reached.

FIG. 4B illustrates a window configuration 400-b configured to allow multiple PRS block 430 transmissions within the window 435-b. The first wireless device may perform a channel access procedure and gain access to the channel and determine that only a portion of the PRS transmission opportunities 425 within the window 435-b remain in the window 435-b. For instance, the first wireless device may determine that only a portion of the PRS transmission opportunity 425-d remains and the following PRS transmission opportunity 425-e is a first PRS transmission opportunity 425-e available to the first wireless device to transmit a PRS block 430. Thus, the first wireless device may transmit the PRS block 430-c within the first PRS transmission opportunity 425-*e*. Because the window 435-*b* is configured to allow multiple PRS block 430 transmissions, the wireless device may maintain access to the channel in the following PRS transmission opportunity 425-*f* and transmit the PRS block 430-*d*. In some cases, the window 435-*b* may be configured to allow a maximum number of two consecutive PRS block 430 transmissions. Here, the first wireless device may refrain from transmitting a PRS block 430 in the remaining PRS transmission opportunities 425. In some other cases, the window 435-*b* may be configured to allow more than two consecutive PRS block 430 transmissions. Here, the first wireless device may continue to transmit PRS blocks 430 until it has transmitted the maximum number of PRS blocks 430 within the window 435-*b*, or the end of the window 435-*b* is reached.

Figure 5A:
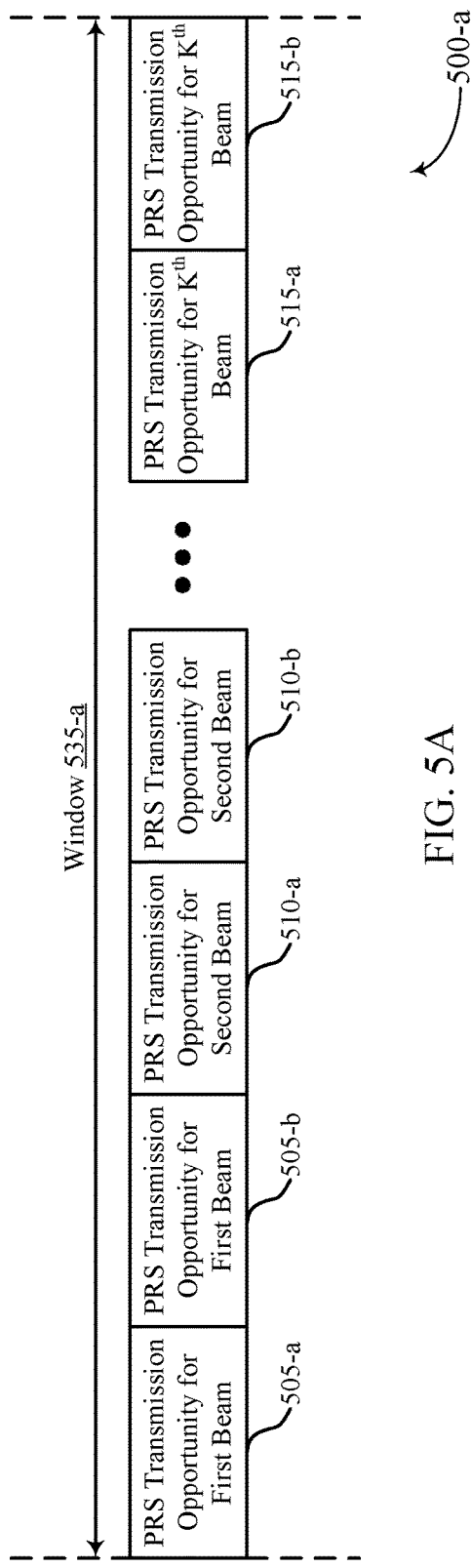
Figure 5B:
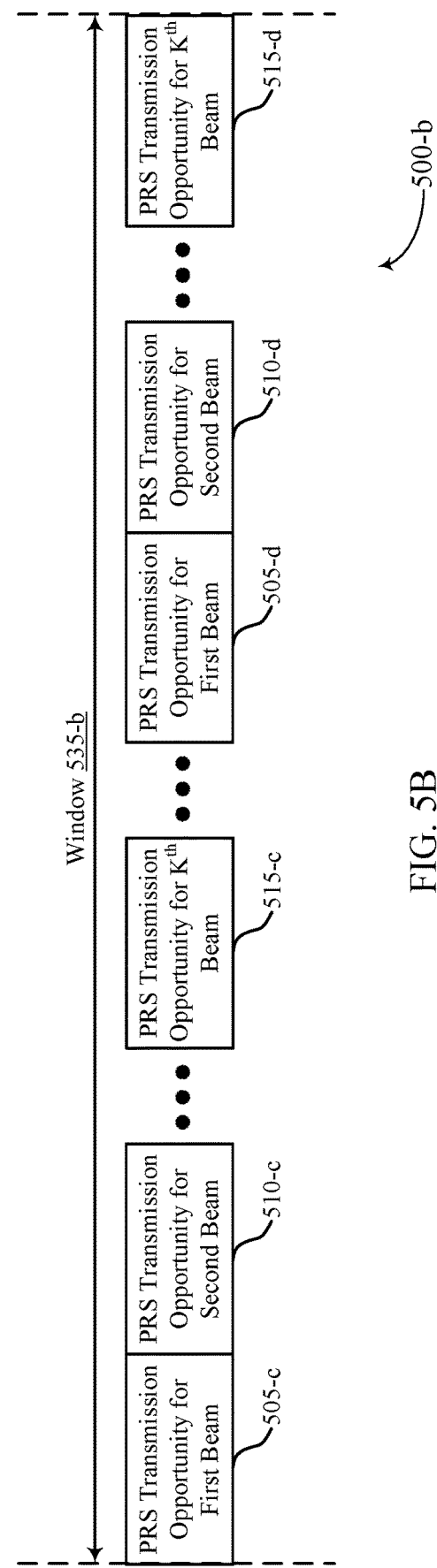

FIGS. 5A and 5B illustrate examples of window configurations 500 that support a window for transmitting a PRS in accordance with various aspects of the present disclosure. The window configurations 500 may indicate a configuration for windows 535. The windows 535 may include aspects of the window 235 as described with reference to FIG. 2, windows 335 as described with reference to FIGS. 3A and 3B, or windows 435 as described with reference to FIGS. 4A and 4B. In some cases, the windows 535 may be preconfigured to enable a first wireless device (e.g., first wireless device 205 as described with reference to FIG. 2) to periodically transmit one or more PRSs to a second wireless device (e.g. second wireless device 215 as described with reference to FIG. 2). The window configurations 500 may indicate a configuration for the PRS transmission opportunities (e.g., PRS transmission opportunities 225, 325, or 425 as described with reference to FIGS. 2-4B). That is, the windows 535 may include multiple PRS transmission opportunities and the window configurations 500 may indicate different parameters associated with each of the PRS transmission opportunities.

Within each of the windows 535, the window configurations 500 may indicate a beam (e.g., a transmission configuration indication (TCI)) associated with each of the PRS transmission opportunities. That is, each of the PRS transmission opportunities within the windows 535 may be associated with a beam transmitted by the first wireless device. In one case, a window 535 may be associated with PRS transmission opportunities for a single TCI state (e.g., PRS block transmissions made by a single beam from the first wireless device). In some other cases, a single window 535 may be configured with multiple PRS transmission opportunities associated with different beams. For instance, the windows 535 may include one or more PRS transmission opportunities 505 for physical resource block (PRB) transmissions made via a first beam from the first wireless device, one or more PRS transmission opportunities 510 for PRS block transmissions made via the second beam from the first wireless device, and/or one or more PRS transmission opportunities 515 for PRS block transmissions made via a $k^{th}$ beam from the first wireless device. Additionally or alternatively, a PRS transmission opportunity may be associated with a combination of beams. That is, the first wireless device may rely on multiple beams to communicate a PRS block transmission within that PRS transmission opportunity.

Each of the window configurations 500 may be preconfigured and known by both the first wireless device and the second wireless device. During the windows 535, the first wireless device may perform a channel access procedure to obtain access to a channel for transmitting a PRS block (e.g., a PRS block 230 as described with reference to FIG. 2, a PRS block 430 as described with reference to FIG. 4) within one or more of the PRS transmission opportunities. When a window 535 includes PRS transmission opportunities for PRS block transmissions by different beams, the first wireless device may perform a channel access procedure (e.g., an LBT procedure) with each of the beams associated with one of the PRS transmission opportunities within the window 535. If only a portion of beams associated with a PRS block gain access to the channel (e.g., a subset of the beams associated with transmitting the PRS during the PRS transmission opportunity within the window 535), the first wireless device may refrain from transmitting that PRS block. Additionally or alternatively, if the first wireless device gains access to the channel with each of the beams associated with a PRS transmission opportunity within the window 535, the first wireless device may begin transmitting PRS blocks according to the window configuration 500. In some cases, if some beams associated with some PRS transmission opportunities gain access to the channel, but others fail to gain access to the channel, the first wireless device (e.g., a base station) may selectively transmit PRS blocks by beams that have gained access to the channel.

Once the first wireless device gains access to the channel, the first wireless device may transmit one or more PRS blocks within one or more corresponding PRS transmission opportunities. The second wireless device may begin monitoring for a PRS block at the beginning of the windows 535. The second wireless device may monitor for PRS blocks according to a PRS transmission opportunity granularity. In some cases, the first wireless device may transmit more than one PRS block (e.g., by different beams) in parallel. That is, the different beams may enable the first wireless device to spatially transmit multiple PRS blocks at a same time.

Window configuration 500-*a* may illustrate a window configuration 500-*a* where the window 535-*a* includes consecutive PRS transmission opportunities for PRS transmissions by a same beam. Window configuration 500-*b* may illustrate a window configuration 500-*b* where the window 535-*b* includes PRS transmission opportunities that are interleaved according to a corresponding beam.

FIG. 5A illustrates a window configuration 500-*a* where the window 535-*a* is configured to support PRS transmission opportunities associated with different beams of the first wireless device. The window configuration 500-*a* may include consecutive PRS transmission opportunities for a single beam. For instance, the first PRS transmission opportunity may be a PRS transmission opportunity 505-*a* associated with a first beam of the first wireless device followed by a second PRS transmission opportunity 505-*b* associated with the first beam. The next PRS transmission opportunity 510-*a* may be associated with a second beam of the first wireless device. The next consecutive PRS transmission opportunity 510-*b* may also be associated with the second beam. The window 535-*a* may continue to include PRS transmission opportunities organized according to the associated beams. The last beam associated with the window configuration 500-*a* may be beam k. The final PRS transmission opportunities 515 within the window 535-*a* may be associated with the $k^{th}$ beam.

FIG. 5B illustrates a window configuration 500-*b* where the window 535-*b* is configured to support PRS transmission opportunities associated with different beams of the first wireless device. The window configuration 500-*b* may include PRS transmission opportunities that are interleaved according to an associated beam. For instance, the first PRS transmission opportunity may be a PRS transmission opportunity 505-*c* associated with a first beam of the first wireless device. The next PRS transmission opportunity may be a PRS opportunity 510-c associated with a second beam of the first wireless device. The window 535-b may continue to interleave PRS transmission opportunities according to beams associated with the first wireless device. The last beam included within the window configuration 500-b may be beam k. The $k^{th}$ PRS transmission opportunity may be a PRS opportunity 515-d associated with a $k^{th}$ beam of the first wireless device. The interleaved PRS transmission opportunities may continue for the length of the window 535-b. That is, the window 535-b may further include PRS transmission opportunities 505-d, 510-d, and 515-d.

FIGS. 6A and 6B illustrate examples of PRS block configurations 600 that support a window for transmitting a PRS in accordance with various aspects of the present disclosure. The PRS block configurations 600 may indicate a configuration for PRS blocks 630. Each of the PRS block configurations 600 may be indicated by a number of symbols (e.g., OFDM symbols) and a comb spacing parameter. The PRS block configurations 600 may further be indicated by a starting slot and symbol, downlink PRS resource identifier, sequence identifier, quasi-colocation (QCL) type, a source reference signal, or an RE offset (e.g., one for an entire PRS block 630, one for each symbol within the PRS block 630).

FIG. 6A illustrates an example PRS block configuration 600-a of PRS block 630-a. The PRS block 630-a may include a quantity of symbols 605-a that spans six OFDM symbols. The comb spacing parameter indicates a comb spacing 610-a of six REs. That is, within a single OFDM symbol, a PRS RE is mapped to the PRS block 630-a every six REs. Further, the PRS block configuration 600-a may configure different numbers of RE offsets for each of the OFDM symbols within the PRS block 630-a (e.g., to result in staggering). For example, the RE offset for the first OFDM symbol within the PRS block 630-a may be zero while the RE offset for the second OFDM symbol within the PRS block 630-a may be one.

FIG. 6B illustrates an example PRS block configuration 600-b of PRS block 630-b. The PRS block 630-b may include a quantity of symbols 605-b that spans four OFDM symbols. The comb spacing parameter indicates a comb spacing 610-b of four REs. That is, within a single OFDM symbol, a PRS RE is mapped to the PRS block 630-b every four REs. Further, the PRS block configuration 600-b may configure different numbers of RE offsets for each of the OFDM symbols within the PRS block 630-b (e.g., to result in staggering). For example, the RE offset for the first OFDM symbol within the PRS block 630-b may be zero while the RE offset for the second OFDM symbol within the PRS block 630-b may be two.

FIGS. 7A and 7B illustrates examples of PRS block configurations 700 that support a window for transmitting a PRS in accordance with various aspects of the present disclosure. The PRS block configurations 700 may indicate a configuration for PRS blocks 730. Each of the PRS block configurations 700 may be indicated by a number of symbols (e.g., OFDM symbols) and a comb spacing parameter. The PRS block configurations 700 may further be indicated by a starting slot and symbol, downlink PRS resource identifier, sequence identifier, and an RE offset (e.g., one for an entire PRS block 730, one for each symbol within the PRS block 730).

FIG. 7A illustrates an example PRS block configuration 700-a of PRS block 730-a. The PRS block 730-a may include a quantity of symbols 705-a that spans three OFDM symbols. The comb spacing parameter indicates a comb spacing 710-a of two REs. That is, within a single OFDM symbol, a PRS RE is mapped to the PRS block 730-a every two REs. Further, the PRS block configuration 700-a may configure different numbers of RE offsets for each of the OFDM symbols within the PRS block 730-a (e.g., to result in staggering). For example, the RE offset for the first OFDM symbol within the PRS block 730-a may be zero while the RE offset for the second OFDM symbol within the PRS block 730-a may be one.

FIG. 7B illustrates an example PRS block configuration 700-b of PRS block 730-b. The PRS block 730-b may include a quantity of symbols 705-b that spans four OFDM symbols. The comb spacing parameter indicates a comb spacing 710-b of four REs. That is, within a single OFDM symbol, a PRS RE is mapped to the PRS block 730-b every four REs. Further, the PRS block configuration 700-b may configure a single RE offset for each of the OFDM symbols within the PRS block 730-b. For example, the RE offset for each of the OFDM symbols within the PRS block 730-b may be two.

Figure 8:
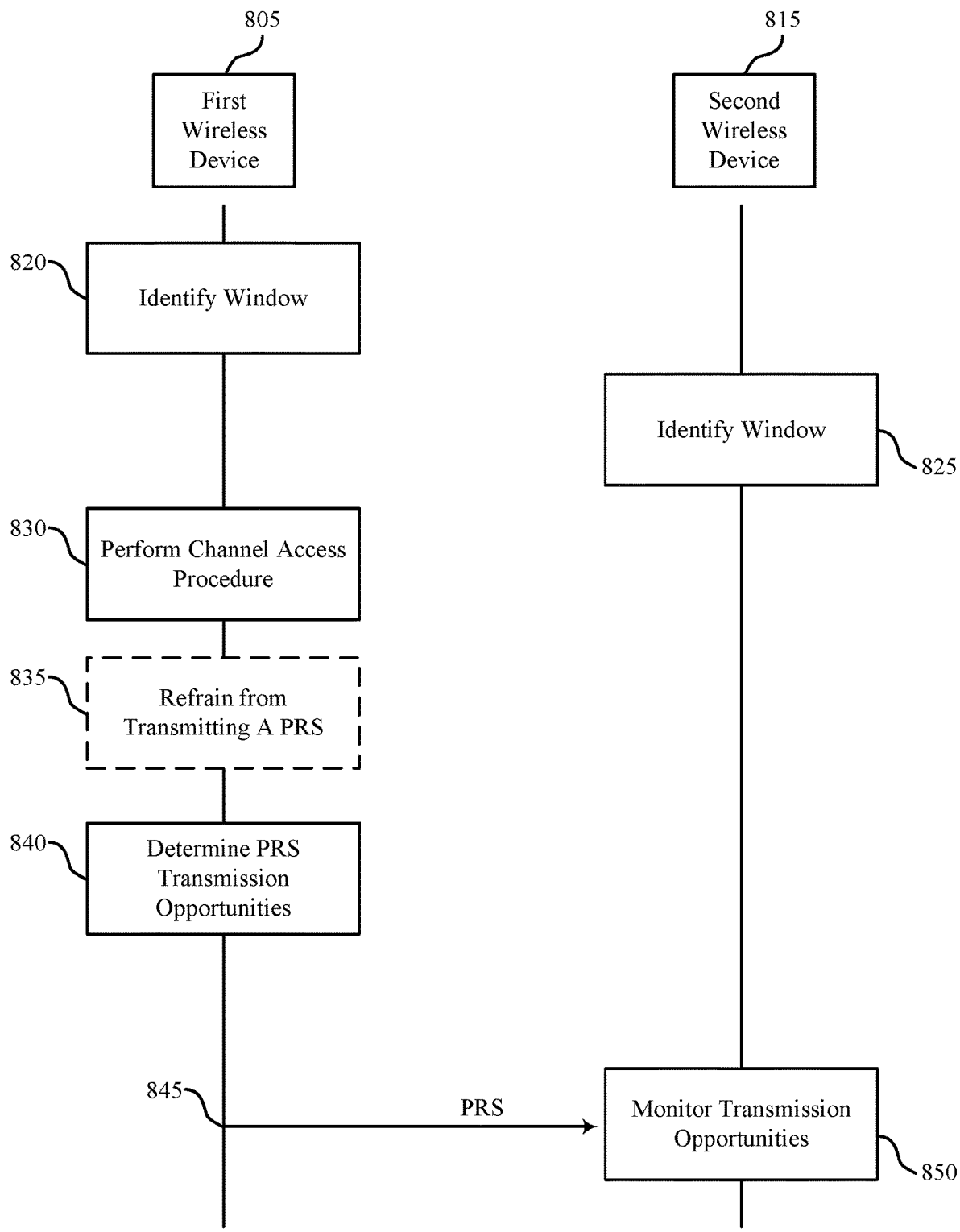
FIG. 8 illustrates a process flow that supports window for transmitting a positioning reference signal in accordance with aspects of the present disclosure.

FIG. 8 illustrates an example of a process flow 800 that supports a window for transmitting a PRS in accordance with various aspects of the present disclosure. The process flow 800 may support aspects of the wireless communications system 100 and 200, as described with reference to FIGS. 1 and 2. For example, the process flow 800 may include communications between a first wireless device 805 or a second wireless device 815. The first wireless device 805 may include aspects of a base station or a first wireless device as described with reference to FIGS. 1 and 2, respectively. The second wireless device 815 may include aspects of a UE or a second wireless device as described with reference to FIGS. 1 and 2 respectively. In the following description of the process flow 800, the operations performed by the first wireless device 805 and the second wireless device 815 may be performed in different orders or at different times. Some operations may also be omitted from the process flow 800, and other operations may be added to the process flow 800.

At 820, the first wireless device 805 may identify a window for transmitting a PRS. The window may include a set of PRS transmission opportunities for a channel. At 825, the second wireless device 815 may identify the window for receiving the PRS. At 830, the first wireless device 805 may perform a channel access procedure during the window.

At 835, the first wireless device 805 may optionally refrain from transmitting a PRS. For instance, the first wireless device 805 may perform the channel access procedure and fail to gain access to the channel during the window. Here, the first wireless device 805 may refrain from transmitting the PRS. Additionally or alternatively, the first wireless device 805 may determine that there is a portion of a PRS transmission opportunity remaining within the window after gaining access to the channel during the channel access procedure. Here, the first wireless device 805 may refrain from transmitting the PRS during the portion of the PRS transmission opportunity.

At 840, the first wireless device 805 may determine one or more PRS transmission opportunities remaining within the window (e.g., identified at 820). For instance, the first wireless device 805 may determine at least a subset of the set of PRS transmission opportunities that are remaining in the window subsequent to obtaining access to the channel during the channel access procedure.

At 845, the first wireless device 805 may transmit a PRS during one or more of the remaining PRS transmission opportunities within the window. In some cases, the first wireless device 805 may transmit multiple PRS transmissions (e.g., PRS blocks) during the window. In one instance, the first wireless device 805 may transmit multiple PRS transmissions consecutively during the window. In another instance, the first wireless device 805 may transit multiple PRS transmissions during overlapping PRS transmission opportunities within the window. The first wireless device 805 may determine a quantity of PRSs to transmit during the window (e.g., a maximum number of PRSs to transmit during the window). The first wireless device 805 may determine whether the quantity of PRSs to transmit during the window exceeds or is less than the number of remaining PRS transmission opportunities within the window. If the quantity of PRSs to be transmitted during the window is less than the number of remaining PRS transmission opportunities, the first wireless device 805 may transmit the quantity of PRS transmissions and subsequently refrain from transmitting PRSs in the following PRS transmission opportunities within the window. Additionally or alternatively, if the quantity of PRSs to be transmitted during the window is greater than the number of remaining PRS transmission opportunities, the first wireless device 805 may transmit PRSs within each of the remaining PRS transmission opportunities.

At 850, the second wireless device 815 may monitor the one or more PRS transmission opportunities for PRS transmissions from the first wireless device. In some cases, the second wireless device may determine a quantity of PRSs to be transmitted during the window (e.g., a maximum number of PRSs to be transmitted during the window). If, based on monitoring the PRS transmission opportunities, the second wireless device 815 detects the quantity of PRS transmissions, the second wireless device 815 may refrain from monitoring the remaining PRS transmission opportunities within the window.

Figure 9:
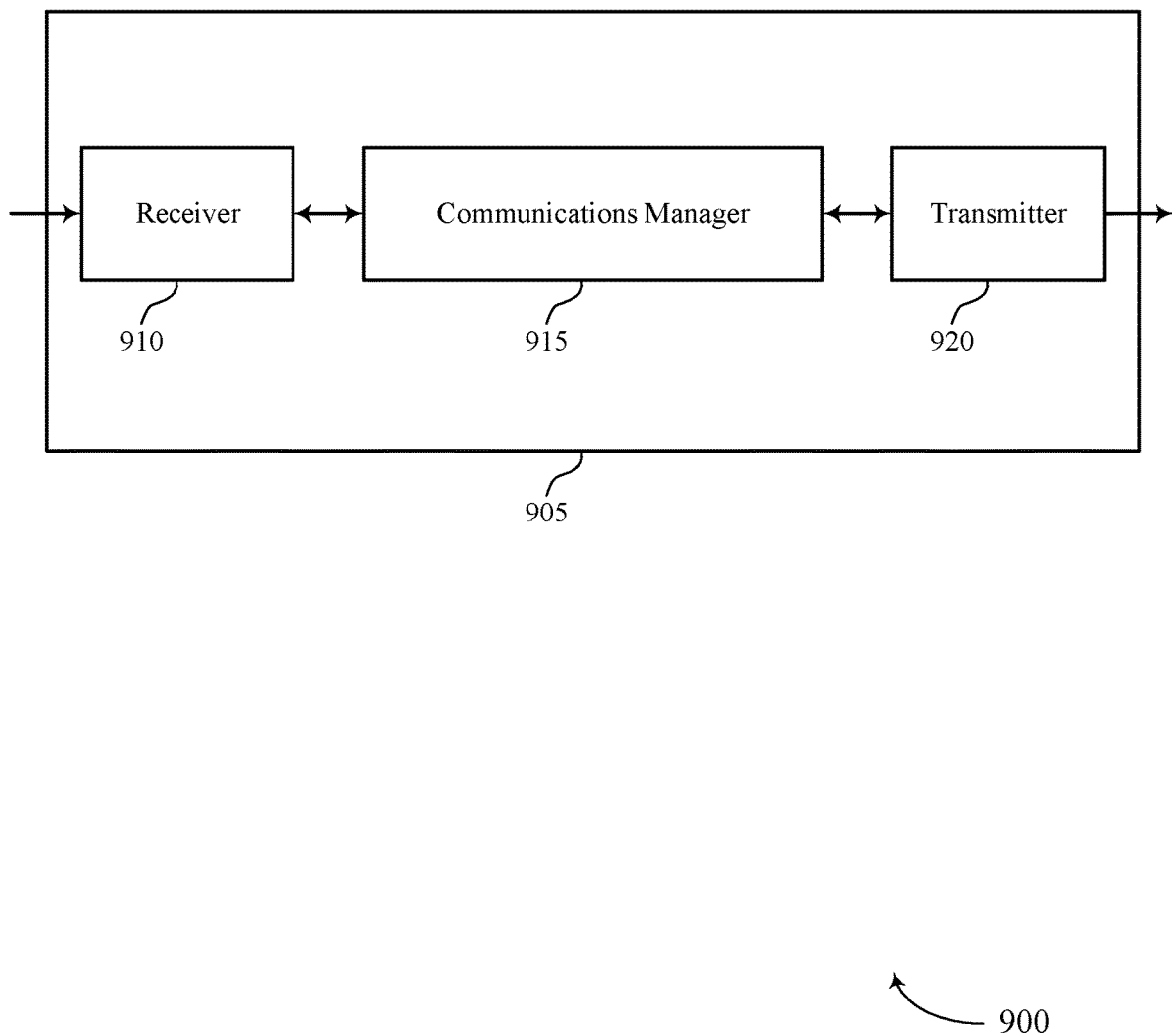
FIGS. 9 and 10 show block diagrams of devices that support window for transmitting a positioning reference signal in accordance with aspects of the present disclosure.

FIG. 9 shows a block diagram 900 of a device 905 that supports window for transmitting a PRS in accordance with aspects of the present disclosure. The device 905 may be an example of aspects of a UE 115 or a second wireless device (e.g., second wireless device 215, 815) as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to window for transmitting a PRS, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a window for receiving a PRS via a channel associated with channel access procedures, the window including a set of PRS transmission opportunities within the window, monitor one or more of the set of PRS transmission opportunities during the window for the PRS, and detect the PRS within at least one of the one or more of the set of PRS transmission opportunities based on monitoring the one or more of the set of PRS transmission opportunities. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some cases, the communications manager 915, or its sub-components, may be a separate and distinct component in accordance with various aspects of the present disclosure. In some cases, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some cases, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
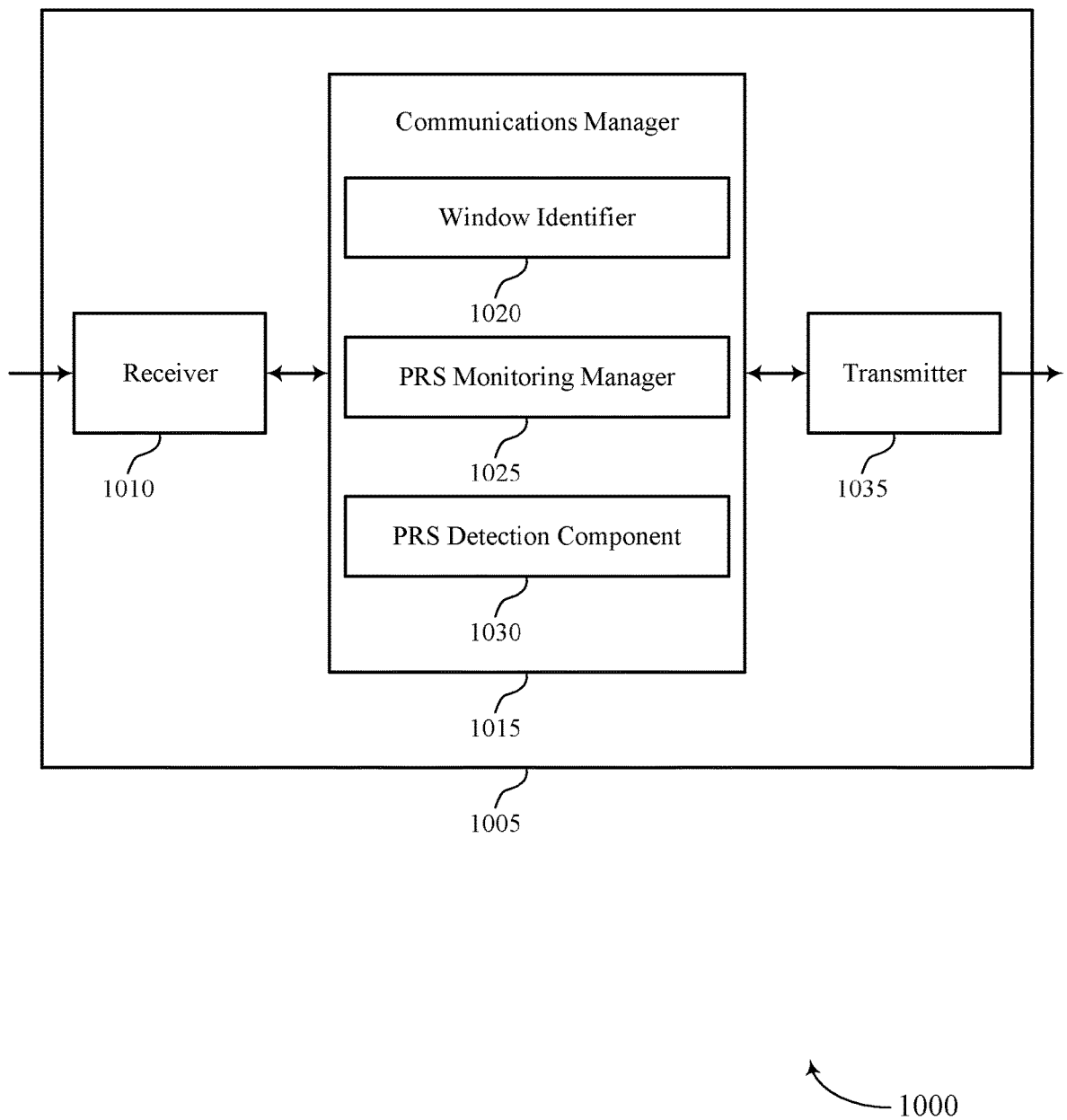

FIG. 10 shows a block diagram 1000 of a device 1005 that supports window for transmitting a PRS in accordance with aspects of the present disclosure. The device 1005 may be an example of aspects of a device 905, a second wireless device, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to window for transmitting a PRS, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a window identifier 1020, a PRS monitoring manager 1025, and a PRS detection component 1030. The communications manager 1015 may be an example of aspects of the communications manager 1210 described herein.

The window identifier 1020 may identify a window for receiving a PRS via a channel associated with channel access procedures, the window including a set of PRS transmission opportunities within the window.

The PRS monitoring manager 1025 may monitor one or more of the set of PRS transmission opportunities during the window for the PRS.

The PRS detection component 1030 may detect the PRS within at least one of the one or more of the set of PRS transmission opportunities based on monitoring the one or more of the set of PRS transmission opportunities.

The transmitter 1035 may transmit signals generated by other components of the device 1005. In some cases, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
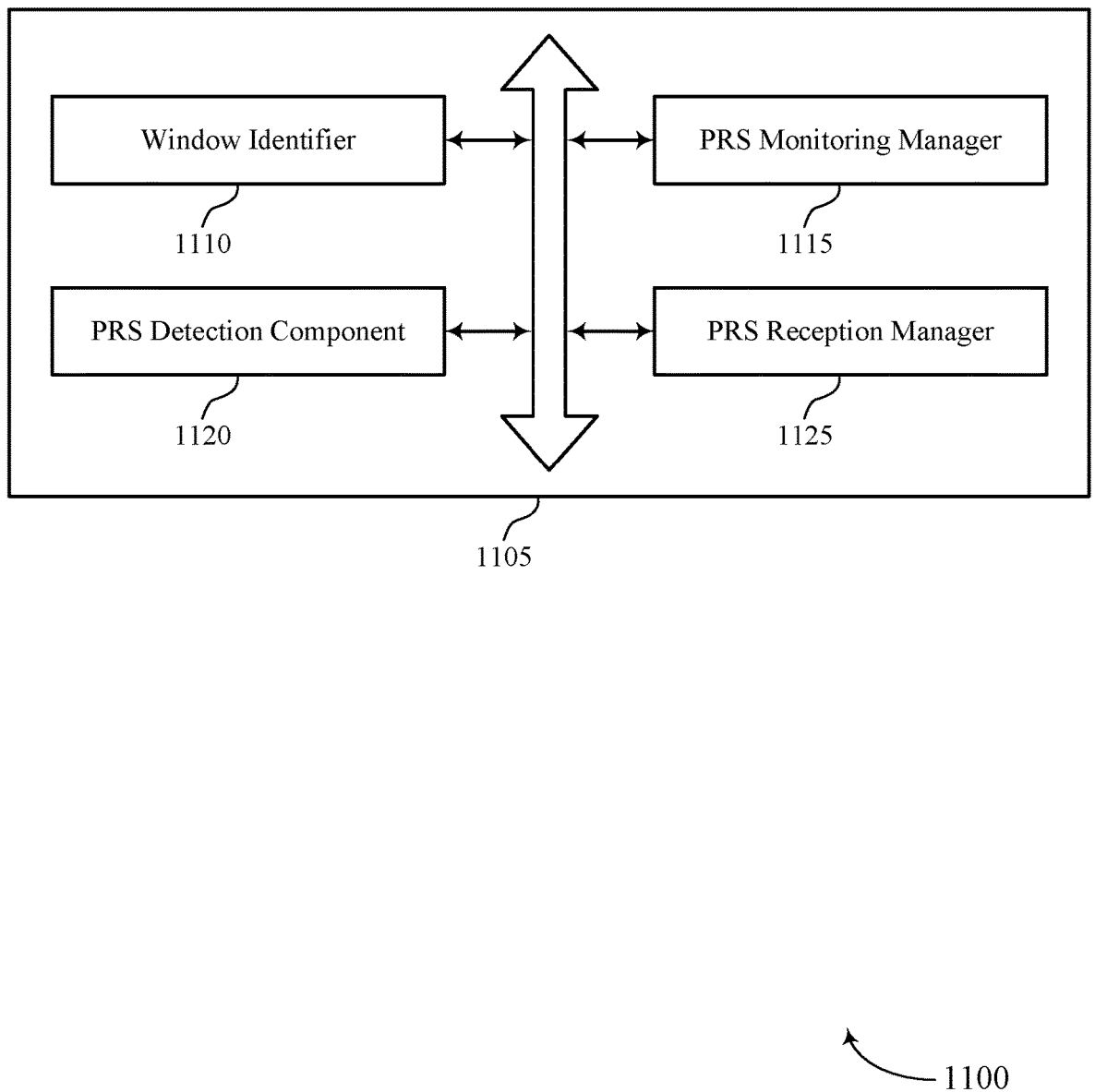
FIG. 11 shows a block diagram of a base station that supports window for transmitting a positioning reference signal in accordance with aspects of the present disclosure.

FIG. 11 shows a block diagram 1100 of a communications manager 1105 that supports window for transmitting a PRS in accordance with aspects of the present disclosure. The communications manager 1105 may be an example of aspects of a communications manager 915, a communications manager 1015, or a communications manager 1210 described herein. The communications manager 1105 may include a window identifier 1110, a PRS monitoring manager 1115, a PRS detection component 1120, and a PRS reception manager 1125. Each of these modules may communicate, directly or indirectly, with one another (e.g., via one or more buses).

The window identifier 1110 may identify a window for receiving a PRS via a channel associated with channel access procedures, the window including a set of PRS transmission opportunities within the window. In some cases, each of the set of PRS transmission opportunities occur consecutively within the window. In some instances, a portion of a first transmission opportunity of the set of PRS transmission opportunities occurs at a same time as a portion of a second transmission opportunity of the set of PRS transmission opportunities.

The PRS monitoring manager 1115 may monitor one or more of the set of PRS transmission opportunities during the window for the PRS. In some cases, the PRS monitoring manager 1115 may refrain from monitoring a remaining quantity of PRS transmission opportunities within the window based on determining that the maximum quantity of PRSs have been received.

In some cases, the PRS monitoring manager 1115 may monitor a first quantity of REs within the first quantity of symbols of the first PRS transmission opportunity according to the first comb spacing parameter, where detecting the PRS is based on monitoring the first quantity of REs within the first quantity of symbols. In some cases, the PRS monitoring manager 1115 may monitor a second quantity of REs within the second quantity of symbols spanning the second PRS transmission opportunity according to the second comb spacing parameter. In some cases, the PRS monitoring manager 1115 may monitor different sets of REs within a first symbol of the first quantity of symbols and a second symbol of the first quantity of symbols. In some cases, the PRS monitoring manager 1115 may monitor a same set of REs within each symbol of the first quantity of symbols. In some cases, each of the set of PRS transmissions are associated with a first beam and occur nonconsecutively within the window.

The PRS detection component 1120 may detect the PRS within at least one of the one or more of the set of PRS transmission opportunities based on monitoring the one or more of the set of PRS transmission opportunities. In some cases, the PRS detection component 1120 may detect the PRS during a first PRS transmission opportunity of the set of PRS transmission opportunities. In some cases, the PRS detection component 1120 may detect the PRS during a second PRS transmission opportunity of the set of PRS transmission opportunities. In some cases, the PRS detection component 1120 may detect a second PRS based on monitoring the second quantity of REs within the second quantity of symbols.

The PRS reception manager 1125 may determine a maximum quantity of PRSs to be received within the window. In some cases, the PRS reception manager 1125 may determine, after monitoring at least a subset of the one or more of the set of PRS transmission opportunities, that the maximum quantity of PRSs has been received. In some cases, the PRS reception manager 1125 may determine a first quantity of symbols spanning a first PRS transmission opportunity of the one or more of the set of PRS transmission opportunities. In some cases, the PRS reception manager 1125 may determine a first comb spacing parameter associated with the first PRS transmission opportunity, the first comb spacing parameter indicating a quantity of REs between each RE inhabited by the PRS.

In some cases, the PRS reception manager 1125 may determine a second quantity of symbols spanning a second PRS transmission opportunity of the one or more of the set of PRS transmission opportunities the second quantity of symbols different than the first quantity of symbols. In some cases, the PRS reception manager 1125 may determine a second comb spacing parameter associated with the second PRS transmission opportunity. In some cases, the PRS reception manager 1125 may determine an RE offset indicating a position of a first RE of the quantity of REs within a first symbol of the first quantity of symbols, where monitoring the quantity of REs within the first quantity of symbols is based on the RE offset.

Figure 12:
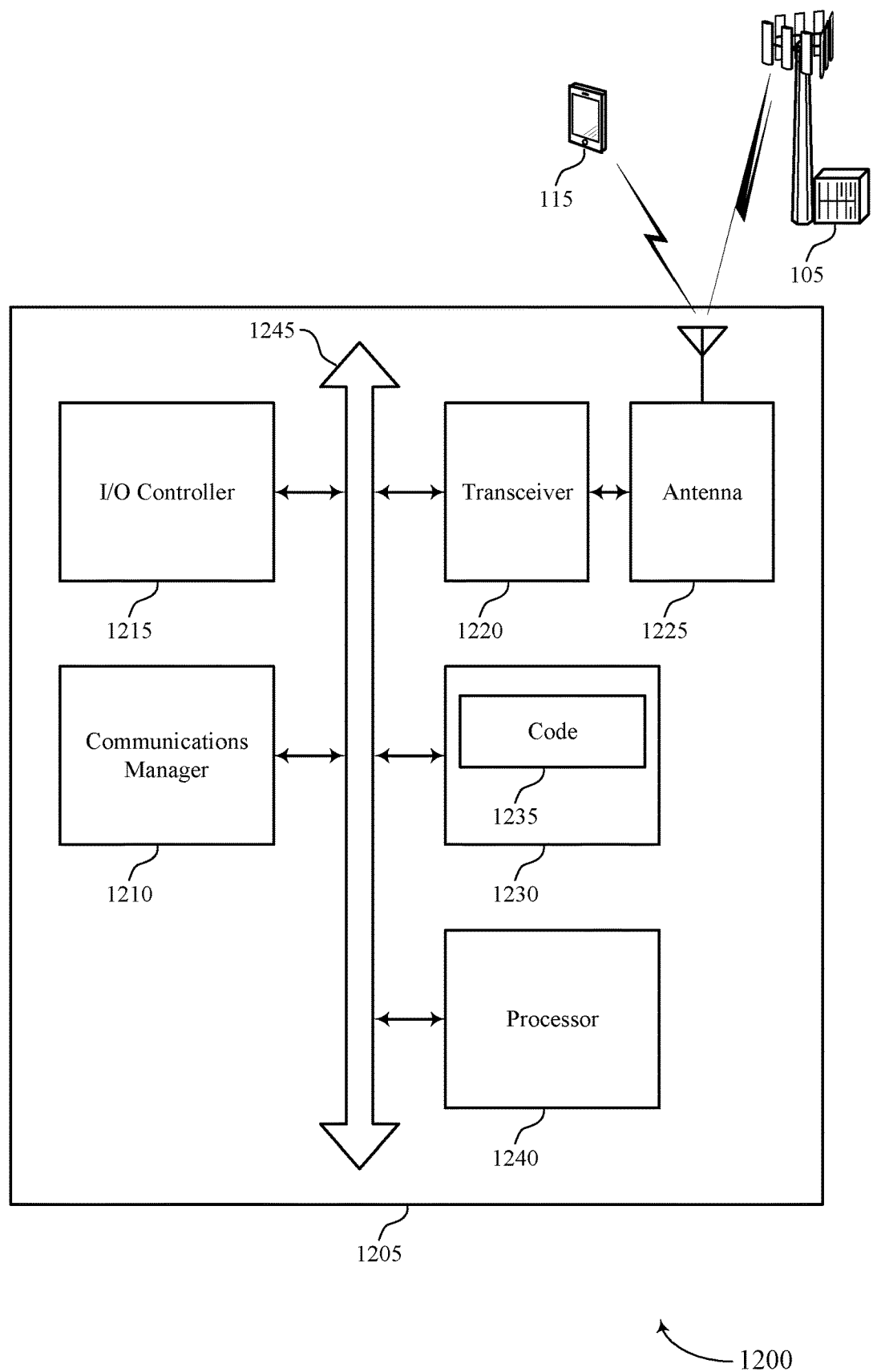
FIG. 12 shows a diagram of a system including a device that supports window for transmitting a positioning reference signal in accordance with aspects of the present disclosure.

FIG. 12 shows a diagram of a system 1200 including a device 1205 that supports window for transmitting a PRS in accordance with aspects of the present disclosure. The device 1205 may be an example of or include the components of device 905, device 1005, a second wireless device, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify a window for receiving a PRS via a channel associated with channel access procedures, the window including a set of PRS transmission opportunities within the window, monitor one or more of the set of PRS transmission opportunities during the window for the PRS, and detect the PRS within at least one of the one or more of the set of PRS transmission opportunities based on monitoring the one or more of the set of PRS transmission opportunities.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting window for transmitting a PRS).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
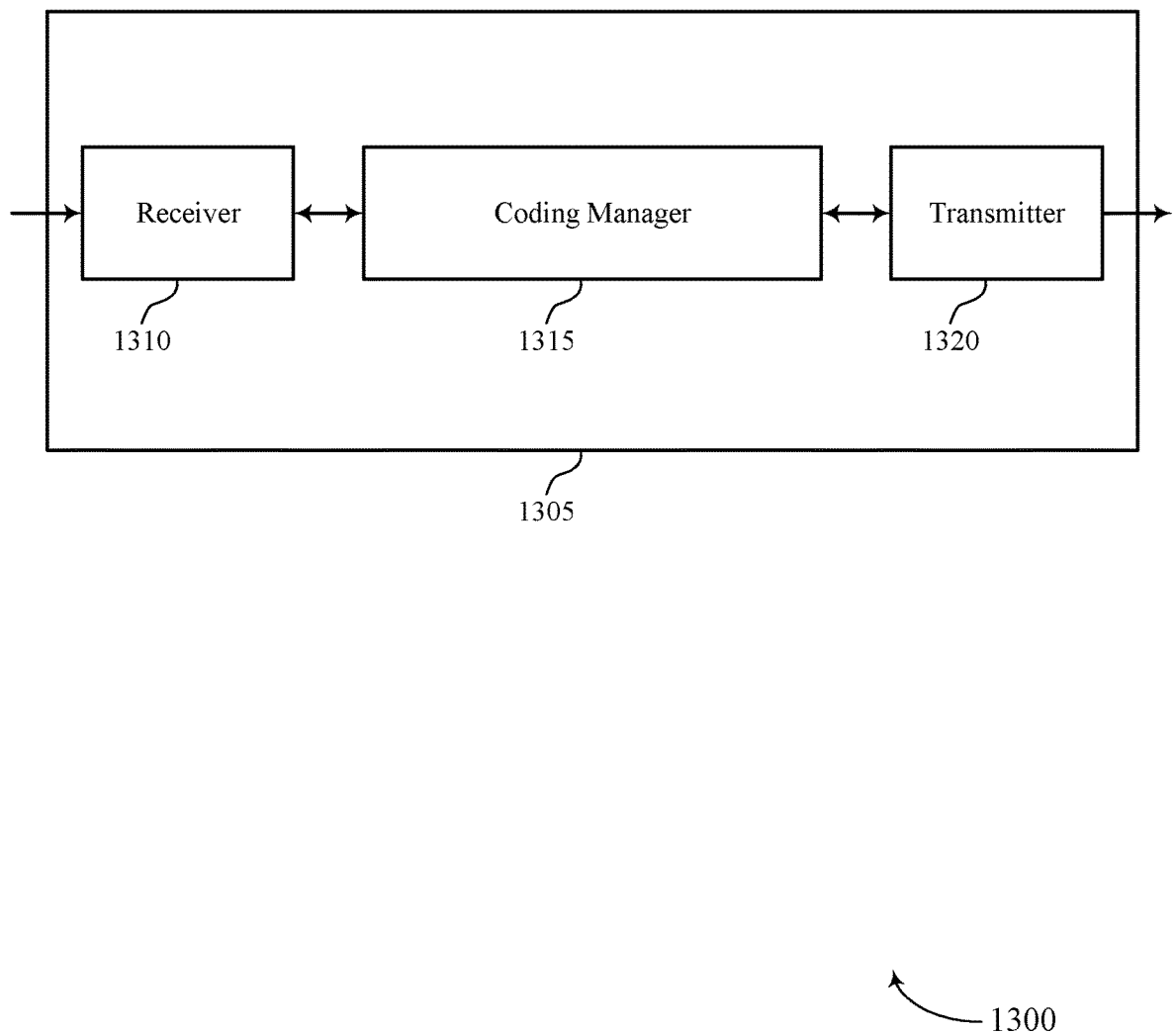
FIGS. 13 and 14 show block diagrams of devices that support window for transmitting a positioning reference signal in accordance with aspects of the present disclosure.

FIG. 13 shows a block diagram 1300 of a device 1305 that supports window for transmitting a PRS in accordance with aspects of the present disclosure. The device 1305 may be an example of aspects of a base station 105, first wireless device 215, or first wireless device 805 as described herein. The device 1305 may include a receiver 1310, a base station coding manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to window for transmitting a PRS, etc.). Information may be passed on to other components of the device 1305. The receiver 1310 may be an example of aspects of the transceiver 1620 described with reference to FIG. 16. The receiver 1310 may utilize a single antenna or a set of antennas.

The coding manager 1315 may identify a window including a set of PRS transmission opportunities for a channel, perform a channel access procedure to access the channel for transmission of a positioning reference signal during the window, determine at least a subset of the set of PRS transmission opportunities that are remaining in the window subsequent to obtaining access to the channel during the window as a result of the channel access procedure, and transmit a PRS during one or more of the at least the subset of the set of PRS transmission opportunities that are remaining in the window. The coding manager 1315 may be an example of aspects of the coding manager 1610 described herein.

The coding manager 1315, or its sub-components, may be implemented in hardware, code (e.g., software or firmware) executed by a processor, or any combination thereof. If implemented in code executed by a processor, the functions of the coding manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The coding manager 1315, or its sub-components, may be physically located at various positions, including being distributed such that portions of functions are implemented at different physical locations by one or more physical components. In some cases, the coding manager 1315, or its sub-components, may be a separate and distinct component in accordance with various aspects of the present disclosure. In some cases, the coding manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some cases, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
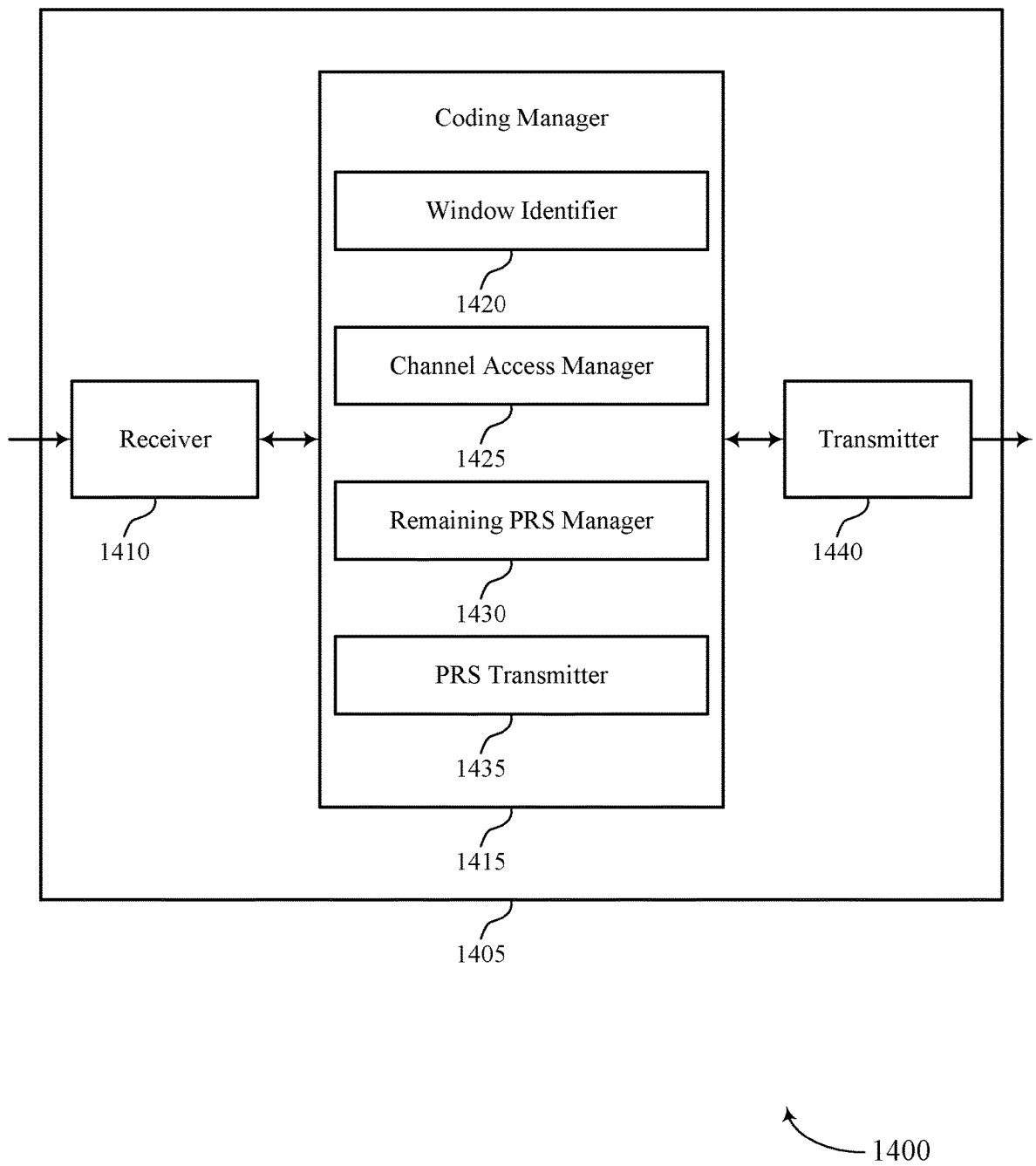

FIG. 14 shows a block diagram 1400 of a device 1405 that supports window for transmitting a PRS in accordance with aspects of the present disclosure. The device 1405 may be an example of aspects of a device 1305, or a base station 105 as described herein. The device 1405 may include a receiver 1410, a base station coding manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to window for transmitting a PRS, etc.). Information may be passed on to other components of the device 1405. The receiver 1410 may be an example of aspects of the transceiver 1620 described with reference to FIG. 16. The receiver 1410 may utilize a single antenna or a set of antennas.

The coding manager 1415 may be an example of aspects of the coding manager 1315 as described herein. The coding manager 1415 may include a window identifier 1420, a channel access manager 1425, a remaining PRS manager 1430, and a PRS transmitter 1435. The coding manager 1415 may be an example of aspects of the coding manager 1610 described herein.

The window identifier 1420 may identify a window including a set of PRS transmission opportunities for a channel.

The channel access manager 1425 may perform a channel access procedure to access the channel for transmission of a positioning reference signal during the window.

The remaining PRS manager 1430 may determine at least a subset of the set of PRS transmission opportunities that are remaining in the window subsequent to obtaining access to the channel during the window as a result of the channel access procedure.

The PRS transmitter 1435 may transmit a PRS during one or more of the at least the subset of the set of PRS transmission opportunities that are remaining in the window.

The transmitter 1440 may transmit signals generated by other components of the device 1405. In some cases, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
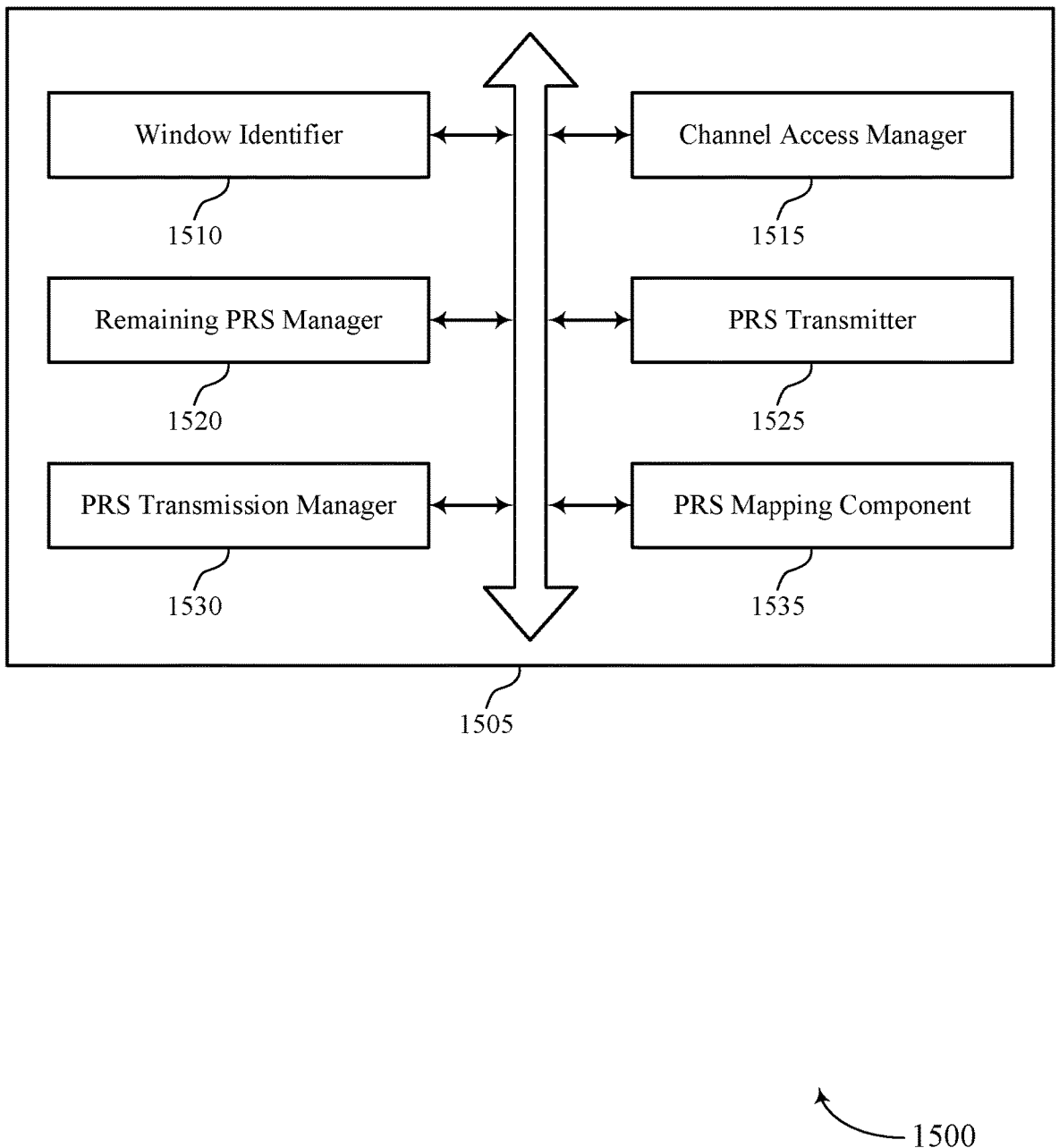
FIG. 15 shows a block diagram of a user equipment (UE) that supports window for transmitting a positioning reference signal in accordance with aspects of the present disclosure.

FIG. 15 shows a block diagram 1500 of a coding manager 1505 that supports window for transmitting a PRS in accordance with aspects of the present disclosure. The coding manager 1505 may be an example of aspects of a coding manager 1315, a coding manager 1415, or a coding manager 1610 described herein. The coding manager 1505 may include a window identifier 1510, a channel access manager 1515, a remaining PRS manager 1520, a PRS transmitter 1525, a PRS transmission manager 1530, and a PRS mapping component 1535. Each of these modules may communicate, directly or indirectly, with one another (e.g., via one or more buses).

The window identifier 1510 may identify a window including a set of PRS transmission opportunities for a channel. In some cases, the window identifier 1510 may identify a second window including a second set of PRS transmission opportunities for transmitting the PRS via a second beam. In some cases, each of the set of PRS transmission opportunities occur consecutively within the window. In some cases, a portion of a first transmission opportunity of the set of PRS transmission opportunities occurs at a same time as a portion of a second transmission opportunity of the set of PRS transmission opportunities. In some cases, the PRS is a first PRS, and where the window includes the set of PRS transmission opportunities for transmitting the first PRS via a first beam.

In some cases, the PRS is a first PRS. In some cases, a first PRS transmission opportunity of the set of PRS transmission opportunities is for transmitting the first PRS via a first beam. In some cases, a second PRS transmission opportunity of the set of PRS transmission opportunities is for transmitting a second PRS via a second beam.

The channel access manager 1515 may perform a channel access procedure to access the channel for transmission of a positioning reference signal during the window. In some cases, the channel access manager 1515 may perform a first channel access procedure via a first beam and gaining access to the channel via the first beam. In some cases, the channel access manager 1515 may perform a second channel access procedure by a second beam and gaining access to the channel via the second beam, where transmitting the PRS during is based on gaining access to the channel via the first beam and gaining access to the channel via the second beam. In some cases, performing a second channel access procedure by a second beam and failing to gain access to the channel via the second beam, where transmitting the PRS further includes transmitting the positioning reference signal via the first beam and refraining from transmitting the positioning reference signal via the second beam.

In some cases, the channel access manager 1515 may perform a first channel access procedure to access the channel during a first PRS transmission opportunity of the set of PRS transmission opportunities by a set of beams. In some cases, the channel access manager 1515 may determine a channel access failure for at least one of the set of beams based on performing the first channel access procedure. In some cases, the channel access manager 1515 may refrain from transmitting a PRS during the PRS transmission opportunity based on determining the channel access failure. In some cases, the channel access manager 1515 may perform a second channel access procedure to access the channel during a second PRS transmission opportunity of the set of PRS transmission opportunities.

In some cases, the channel access manager 1515 may gain access to the channel for each of the set of beams during the second PRS transmission opportunity, where transmitting the PRS is based on gaining access to the channel.

The remaining PRS manager 1520 may determine at least a subset of the set of PRS transmission opportunities that are remaining in the window subsequent to obtaining access to the channel during the window as a result of the channel access procedure. In some cases, the remaining PRS manager 1520 may determine a portion of a PRS transmission opportunity remaining in the window subsequent to obtaining access to the channel during the window as a result of the channel access procedure.

The PRS transmitter 1525 may transmit a PRS during one or more of the at least the subset of the set of PRS transmission opportunities that are remaining in the window. In some cases, the PRS transmitter 1525 may refrain from transmitting the PRS during the portion of the PRS transmission opportunity. In some cases, the PRS transmitter 1525 may transmit the PRS during a first PRS transmission opportunity of the at least the subset of the set of PRS transmission opportunities. In some cases, the PRS transmitter 1525 may transmit the PRS during a second PRS transmission opportunity of the at least the subset of the set of PRS transmission opportunities. In some cases, the PRS transmitter 1525 may transmit the quantity of PRSs within consecutive PRS transmission opportunities of the at least the subset of the set of PRS transmission opportunities.

In some cases, the PRS transmitter 1525 may refrain from transmitting the PRS after transmitting the quantity of PRSs within a remaining quantity of the at least the subset of the set of PRS transmission opportunities within the window. In some cases, the PRS transmitter 1525 may transmit the second quantity of PRSs over the at least the subset of the set of PRS transmission opportunities remaining in the window.

The PRS transmission manager 1530 may determine a quantity of PRSs to transmit during the window. In some cases, the PRS transmission manager 1530 may determine that a quantity of the at least the subset of the set of PRS transmission opportunities remaining in the window subsequent to obtaining access to the channel exceeds the quantity of PRSs to transmit during the window. In some cases, the PRS transmission manager 1530 may determine a first quantity of PRSs to transmit during the window. In some cases, the PRS transmission manager 1530 may determine that a second quantity of the at least the subset of the set of PRS transmission opportunities remaining in the window subsequent to obtaining access to the channel is less than the first quantity of PRSs to transmit during the window.

The PRS mapping component 1535 may determine a first quantity of symbols spanning a first PRS transmission opportunity of the one or more PRS transmission opportunities. In some cases, the PRS mapping component 1535 may determine a first comb spacing parameter associated with the first PRS transmission opportunity, the first comb spacing parameter indicating a quantity of REs between each RE occupied by the PRS. In some cases, the PRS mapping component 1535 may map the PRS to a first quantity of REs within the first quantity of symbols of the first PRS transmission opportunity according to the first comb spacing parameter, where transmitting the PRS is based on mapping the PRS to the first quantity of REs within the first quantity of symbols.

In some cases, the PRS mapping component 1535 may determine a second quantity of symbols spanning a second PRS transmission opportunity of the one or more PRS transmission opportunities, the second quantity of symbols different than the first quantity of symbols. In some cases, the PRS mapping component 1535 may determine a second comb spacing parameter associated with the second PRS transmission opportunity. In some cases, the PRS mapping component 1535 may map the PRS to a second quantity of REs within the second quantity of symbols spanning the second PRS transmission opportunity according to the second comb spacing parameter, where transmitting the PRS is based on mapping the PRS to the second quantity of REs within the second quantity of symbols. In some cases, the PRS mapping component 1535 may map the PRS to different set of REs within a first symbol of the first quantity of symbols and a second symbol of the first quantity of symbols. In some cases, the PRS mapping component 1535 may determine an RE offset indicating a position of a first RE of the quantity of REs within a first symbol of the first quantity of symbols, where mapping the PRS to the quantity of REs within the first quantity of symbols is based on the RE offset.

Figure 16:
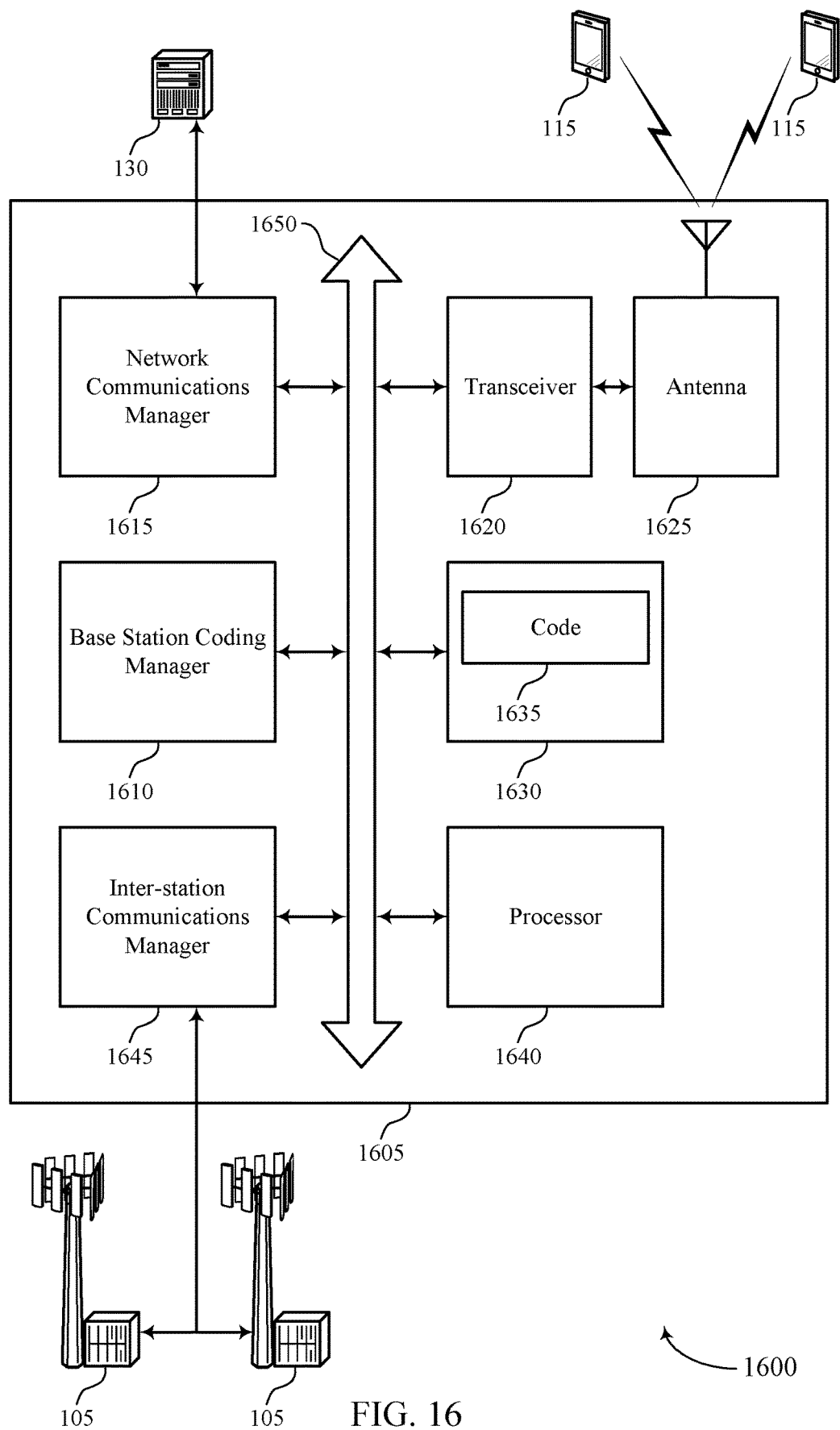
FIG. 16 shows a diagram of a system including a device that supports window for transmitting a positioning reference signal in accordance with aspects of the present disclosure.

FIG. 16 shows a diagram of a system 1600 including a device 1605 that supports window for transmitting a PRS in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station coding manager 1610, a network communications manager 1615, a transceiver 1620, an antenna 1625, memory 1630, a processor 1640, and an inter-station communications manager 1645. These components may be in electronic communication via one or more buses (e.g., bus 1650).

The coding manager 1610 may identify a window including a set of PRS transmission opportunities for a channel, perform a channel access procedure to access the channel for transmission of a positioning reference signal during the window, determine at least a subset of the set of PRS transmission opportunities that are remaining in the window subsequent to obtaining access to the channel during the window as a result of the channel access procedure, and transmit a PRS during one or more of the at least the subset of the set of PRS transmission opportunities that are remaining in the window.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting window for transmitting a PRS).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some cases, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
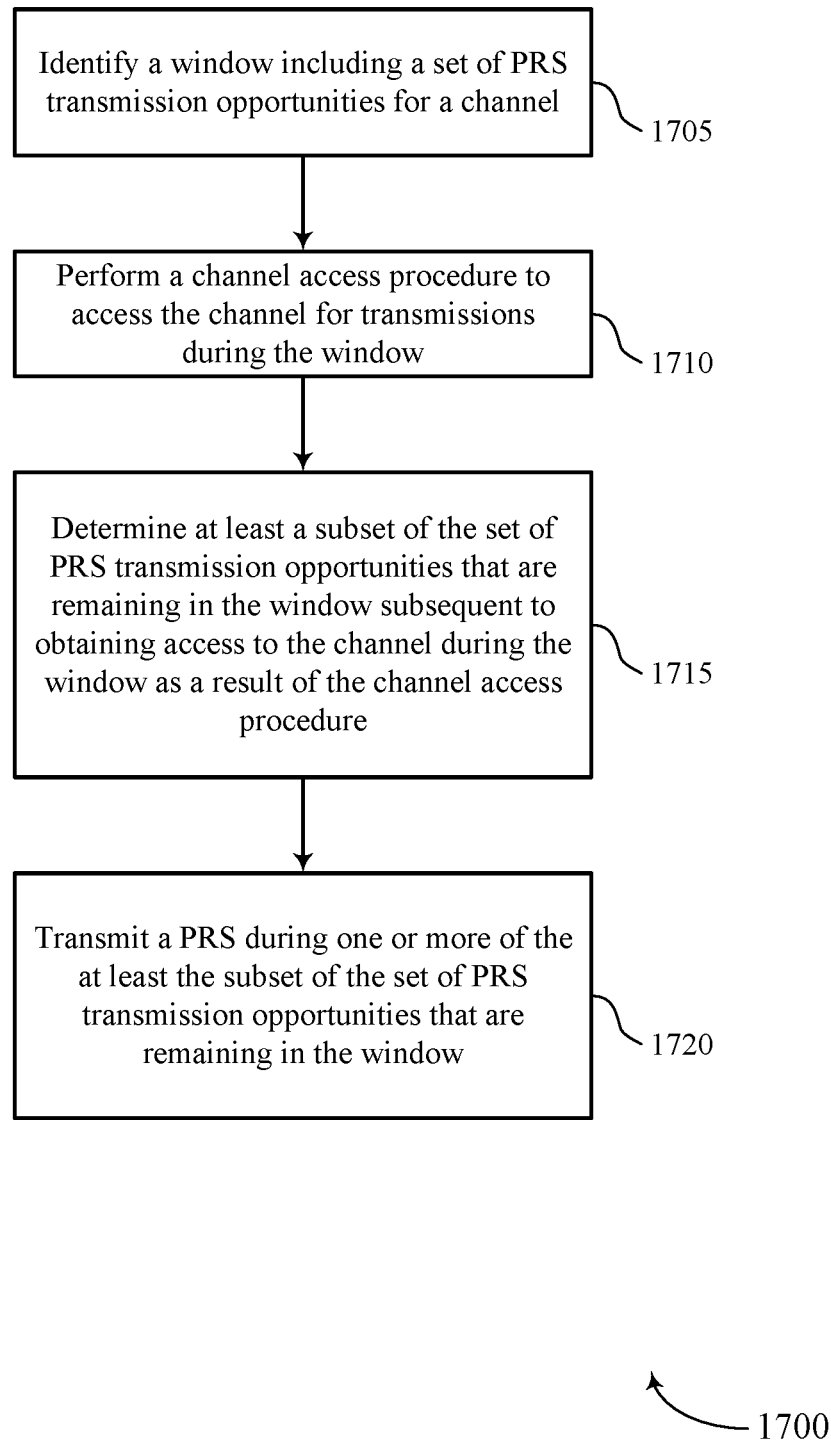
FIGS. 17 through 20 show flowcharts illustrating methods that support window for transmitting a positioning reference signal in accordance with aspects of the present disclosure.

FIG. 17 shows a flowchart illustrating a method 1700 that supports window for transmitting a PRS in accordance with aspects of the present disclosure. The operations of method 1700 may be implemented by a base station 105 or its components as described herein. For example, the operations of method 1700 may be performed by a coding manager as described with reference to FIGS. 13 through 16. In some cases, a base station may execute a set of instructions to control the functional elements of the base station to perform the functions described below. Additionally or alternatively, a base station may perform aspects of the functions described below using special-purpose hardware.

At 1705, the base station may identify a window including a set of PRS transmission opportunities for a channel. The operations of 1705 may be performed according to the methods described herein. In some cases, aspects of the operations of 1705 may be performed by a window identifier as described with reference to FIGS. 13 through 16.

At 1710, the base station may perform a channel access procedure to access the channel for transmission of a positioning reference signal during the window. The operations of 1710 may be performed according to the methods described herein. In some cases, aspects of the operations of 1710 may be performed by a channel access manager as described with reference to FIGS. 13 through 16.

At 1715, the base station may determine at least a subset of the set of PRS transmission opportunities that are remaining in the window subsequent to obtaining access to the channel during the window as a result of the channel access procedure. The operations of 1715 may be performed according to the methods described herein. In some cases, aspects of the operations of 1715 may be performed by a remaining PRS manager as described with reference to FIGS. 13 through 16.

At 1720, the base station may transmit a PRS during one or more of the at least the subset of the set of PRS transmission opportunities that are remaining in the window. The operations of 1720 may be performed according to the methods described herein. In some cases, aspects of the operations of 1720 may be performed by a PRS transmitter as described with reference to FIGS. 13 through 16.

Figure 18:
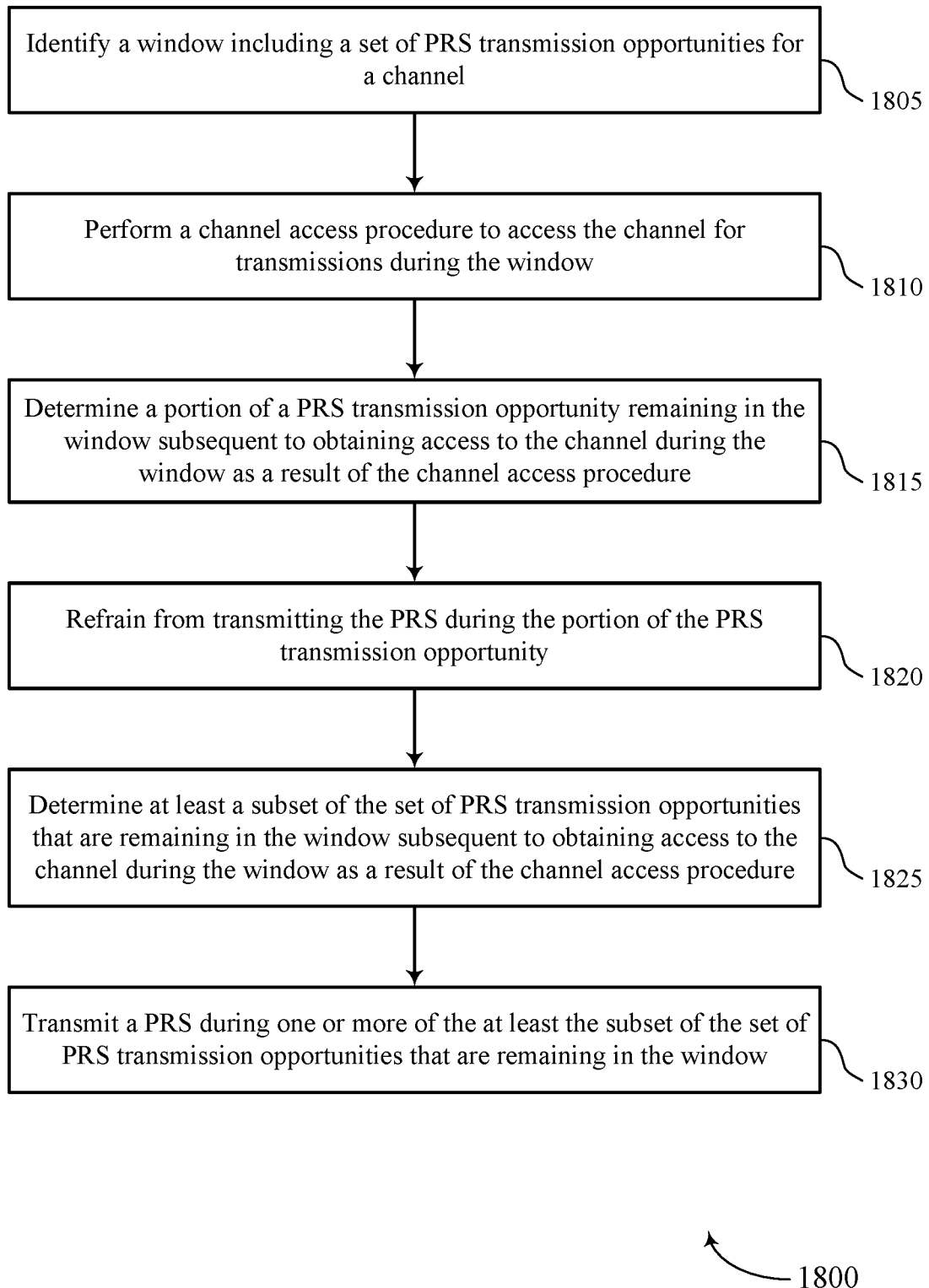

FIG. 18 shows a flowchart illustrating a method 1800 that supports window for transmitting a PRS in accordance with aspects of the present disclosure. The operations of method 1800 may be implemented by a base station 105 or its components as described herein. For example, the operations of method 1800 may be performed by a coding manager as described with reference to FIGS. 13 through 16. In some cases, a base station may execute a set of instructions to control the functional elements of the base station to perform the functions described below. Additionally or alternatively, a base station may perform aspects of the functions described below using special-purpose hardware.

At 1805, the base station may identify a window including a set of PRS transmission opportunities for a channel. The operations of 1805 may be performed according to the methods described herein. In some cases, aspects of the operations of 1805 may be performed by a window identifier as described with reference to FIGS. 13 through 16.

At 1810, the base station may perform a channel access procedure to access the channel for transmission of a positioning reference signal during the window. The operations of 1810 may be performed according to the methods described herein. In some cases, aspects of the operations of 1810 may be performed by a channel access manager as described with reference to FIGS. 13 through 16.

At 1815, the base station may determine a portion of a PRS transmission opportunity remaining in the window subsequent to obtaining access to the channel during the window as a result of the channel access procedure. The operations of 1815 may be performed according to the methods described herein. In some cases, aspects of the operations of 1815 may be performed by a remaining PRS manager as described with reference to FIGS. 13 through 16.

At 1820, the base station may refrain from transmitting the PRS during the portion of the PRS transmission opportunity. The operations of 1820 may be performed according to the methods described herein. In some cases, aspects of the operations of 1820 may be performed by a PRS transmitter as described with reference to FIGS. 13 through 16.

At 1825, the base station may determine at least a subset of the set of PRS transmission opportunities that are remaining in the window subsequent to obtaining access to the channel during the window as a result of the channel access procedure. The operations of 1825 may be performed according to the methods described herein. In some cases, aspects of the operations of 1825 may be performed by a remaining PRS manager as described with reference to FIGS. 13 through 16.

At 1830, the base station may transmit a PRS during one or more of the at least the subset of the set of PRS transmission opportunities that are remaining in the window. The operations of 1830 may be performed according to the methods described herein. In some cases, aspects of the operations of 1830 may be performed by a PRS transmitter as described with reference to FIGS. 13 through 16.

Figure 19:
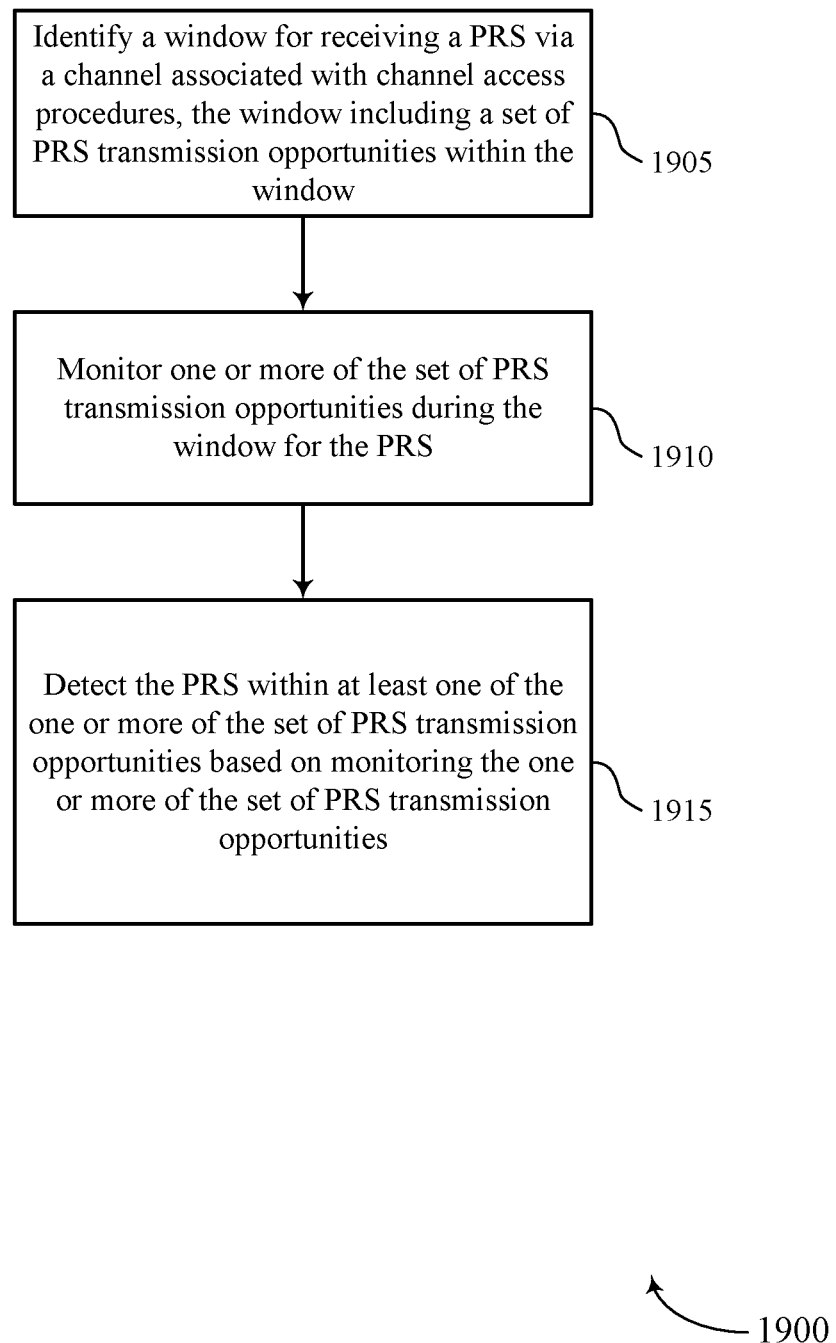

FIG. 19 shows a flowchart illustrating a method 1900 that supports window for transmitting a PRS in accordance with aspects of the present disclosure. The operations of method 1900 may be implemented by a UE 115, a second wireless device, or their components as described herein. For example, the operations of method 1900 may be performed by a communications manager as described with reference to FIGS. 9 through 12. In some cases, a second wireless device may execute a set of instructions to control the functional elements of the second wireless device to perform the functions described below. Additionally or alternatively, a second wireless device may perform aspects of the functions described below using special-purpose hardware.

At 1905, the second wireless device may identify a window for receiving a PRS via a channel associated with channel access procedures, the window including a set of PRS transmission opportunities within the window. The operations of 1905 may be performed according to the methods described herein. In some cases, aspects of the operations of 1905 may be performed by a window identifier as described with reference to FIGS. 9 through 12.

At 1910, the second wireless device may monitor one or more of the set of PRS transmission opportunities during the window for the PRS. The operations of 1910 may be performed according to the methods described herein. In some cases, aspects of the operations of 1910 may be performed by a PRS monitoring manager as described with reference to FIGS. 9 through 12.

At 1915, the second wireless device may detect the PRS within at least one of the one or more of the set of PRS transmission opportunities based on monitoring the one or more of the set of PRS transmission opportunities. The operations of 1915 may be performed according to the methods described herein. In some cases, aspects of the operations of 1915 may be performed by a PRS detection component as described with reference to FIGS. 9 through 12.

Figure 20:
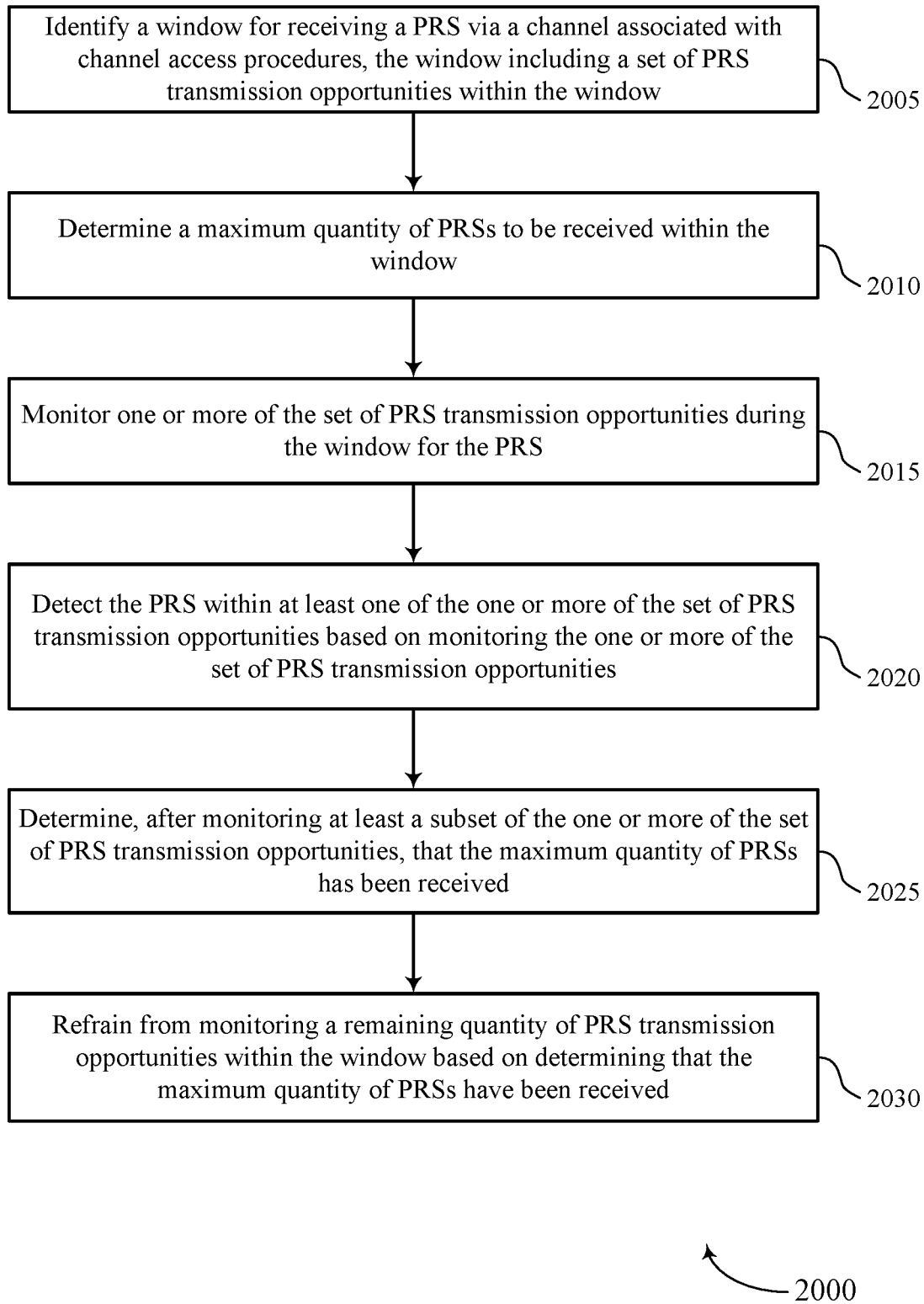

FIG. 20 shows a flowchart illustrating a method 2000 that supports window for transmitting a PRS in accordance with aspects of the present disclosure. The operations of method 2000 may be implemented by a UE 115, a second wireless device, or their components as described herein. For example, the operations of method 2000 may be performed by a communications manager as described with reference to FIGS. 9 through 12. In some cases, a second wireless device may execute a set of instructions to control the functional elements of the second wireless device to perform the functions described below. Additionally or alternatively, a second wireless device may perform aspects of the functions described below using special-purpose hardware.

At 2005, the second wireless device may identify a window for receiving a PRS via a channel associated with channel access procedures, the window including a set of PRS transmission opportunities within the window. The operations of 2005 may be performed according to the methods described herein. In some cases, aspects of the operations of 2005 may be performed by a window identifier as described with reference to FIGS. 9 through 12.

At 2010, the second wireless device may determine a maximum quantity of PRSs to be received within the window. The operations of 2010 may be performed according to the methods described herein. In some cases, aspects of the operations of 2010 may be performed by a PRS reception manager as described with reference to FIGS. 9 through 12.

At 2015, the second wireless device may monitor one or more of the set of PRS transmission opportunities during the window for the PRS. The operations of 2015 may be performed according to the methods described herein. In some cases, aspects of the operations of 2015 may be performed by a PRS monitoring manager as described with reference to FIGS. 9 through 12.

At 2020, the second wireless device may detect the PRS within at least one of the one or more of the set of PRS transmission opportunities based on monitoring the one or more of the set of PRS transmission opportunities. The operations of 2020 may be performed according to the methods described herein. In some cases, aspects of the operations of 2020 may be performed by a PRS detection component as described with reference to FIGS. 9 through 12.

At 2025, the second wireless device may determine, after monitoring at least a subset of the one or more of the set of PRS transmission opportunities, that the maximum quantity of PRSs has been received. The operations of 2025 may be performed according to the methods described herein. In some cases, aspects of the operations of 2025 may be performed by a PRS reception manager as described with reference to FIGS. 9 through 12.

At 2030, the second wireless device may refrain from monitoring a remaining quantity of PRS transmission opportunities within the window based on determining that the maximum quantity of PRSs have been received. The operations of 2030 may be performed according to the methods described herein. In some cases, aspects of the operations of 2030 may be performed by a PRS monitoring manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a window comprising a first quantity of positioning reference signal transmission opportunities;
   determining a second quantity of positioning reference signals to transmit during the window;
   performing a channel access procedure to access the channel for transmission of the positioning reference signals during the window;
   determining that a third quantity of at least a subset of the first quantity of positioning reference signal transmission opportunities that are remaining in the window subsequent to obtaining access to the channel during the window as a result of the channel access procedure exceeds the second quantity of positioning reference signals to transmit during the window;
   transmitting the second quantity of positioning reference signals within consecutive positioning reference signal transmission opportunities of the at least the subset of the first quantity of positioning reference signal transmission opportunities; and
   refraining from transmitting the one or more positioning reference signals after transmitting the second quantity of positioning reference signals within a remaining quantity of the at least the subset of the first quantity of positioning reference signal transmission opportunities within the window.

2. The method of claim 1, further comprising:
   determining a portion of a positioning reference signal transmission opportunity remaining in the window subsequent to obtaining access to the channel during the window as a result of the channel access procedure; and
   refraining from transmitting the second quantity of positioning reference signals during the portion of the positioning reference signal transmission opportunity.

3. The method of claim 1, wherein the transmitting the second quantity of positioning reference signals within the consecutive positioning reference signal transmission opportunities of the at least the subset of the first quantity of positioning reference signal transmission opportunities further comprises:
   transmitting a first positioning reference signal during a first positioning reference signal transmission opportunity of the at least the subset of the first quantity of positioning reference signal transmission opportunities; and
   transmitting a second positioning reference signal during a second positioning reference signal transmission opportunity of the at least the subset of the first quantity of positioning reference signal transmission opportunities.

4. The method of claim 1, wherein a portion of a first transmission opportunity of the first quantity of positioning reference signal transmission opportunities occurs at a same time as a portion of a second transmission opportunity of the first quantity of positioning reference signal transmission opportunities.

5. The method of claim 1, wherein the one or more second quantity of positioning reference signals comprise a first positioning reference signal, and wherein the window comprises the first quantity of positioning reference signal transmission opportunities for transmitting the first positioning reference signal via a first beam.

6. The method of claim 1, wherein:
   the second quantity of positioning reference signals comprise a first positioning reference signal and a second positioning reference signal;
   a first positioning reference signal transmission opportunity of the first quantity of positioning reference signal transmission opportunities is for transmitting the first positioning reference signal via a first beam; and
   a second positioning reference signal transmission opportunity of the first quantity of positioning reference signal transmission opportunities is for transmitting the second positioning reference signal via a second beam.

7. A method, comprising:
   identifying a window comprising a first quantity of positioning reference signal transmission opportunities;
   determining a second quantity of positioning reference signals to transmit during the window;
   performing a channel access procedure to access the channel for transmission of the positioning reference signals during the window;
   determining that a third quantity of the at least the subset of the first quantity of positioning reference signal transmission opportunities remaining in the window subsequent to obtaining access to the channel during the window as a result of the channel access procedure is less than the second quantity of positioning reference signals to transmit during the window; and transmitting the third quantity of positioning reference signals over the at least the subset of the first quantity of positioning reference signal transmission opportunities remaining in the window.

8. A method for wireless communication, comprising:

identifying a window for receiving a one or more positioning reference signals via a channel associated with channel access procedures, the window comprising a first quantity of positioning reference signal transmission opportunities;

determining a second quantity of positioning reference signals to receive during the window;

monitoring one or more of the first quantity of positioning reference signal transmission opportunities during the window for the one or more positioning reference signals;

detecting the second quantity of positioning reference signals within consecutive positioning reference signal transmission opportunities based at least in part on monitoring the one or more of the first quantity of positioning reference signal transmission opportunities;

determining that a third quantity of at least a subset of the first quantity of positioning reference signal transmission opportunities comprising the consecutive positioning reference signal transmission opportunities and a remaining quantity of positioning reference signal transmission opportunities within the window exceeds the second quantity of positioning reference signals to receive during the window; and refraining from monitoring the remaining quantity of positioning reference transmission opportunities after receiving the second quantity of positioning reference signals within the consecutive positioning reference signal transmission opportunities.

9. The method of claim 8, further comprising:

determining that a maximum quantity of positioning reference signals to be received within the window is the second quantity of positioning reference signals;

determining, after monitoring at least a subset of the one or more of the first quantity of positioning reference signal transmission opportunities, that the maximum quantity of positioning reference signals has been received; and refraining from monitoring the remaining quantity of positioning reference signal transmission opportunities within the window based at least in part on determining that the maximum quantity of positioning reference signals have been received.

10. The method of claim 8, wherein the detecting the second quantity of positioning reference signals within the consecutive positioning reference signal transmission opportunities further comprises:

detecting a first positioning reference signal during a first positioning reference signal transmission opportunity of the consecutive positioning reference signal transmission opportunities; and detecting a second positioning reference signal during a second positioning reference signal transmission opportunity of the consecutive positioning reference signal transmission opportunities.

11. The method of claim 8, further comprising:

determining a first quantity of symbols spanning a first positioning reference signal transmission opportunity of the consecutive positioning reference signal transmission opportunities;

determining a first comb spacing parameter associated with the first positioning reference signal transmission opportunity, the first comb spacing parameter indicating a quantity of resource elements between each resource element inhabited by the second quantity of positioning reference signals; and monitoring a first quantity of resource elements within the first quantity of symbols of the first positioning reference signal transmission opportunity according to the first comb spacing parameter, wherein the detecting the second quantity of positioning reference signals is based at least in part on monitoring the first quantity of resource elements within the first quantity of symbols.

12. An apparatus for wireless communication, comprising:

a processor; and memory coupled with the processor, the memory comprising instructions executable by the processor to cause the apparatus to:

identify a window comprising a first quantity of positioning reference signal transmission opportunities;

determine a second quantity of positioning reference signals to transmit during the window;

perform a channel access procedure to access the channel for transmission of the positioning reference signals during the window;

determine that a third quantity of at least a subset of the first quantity of positioning reference signal transmission opportunities that are remaining in the window subsequent to obtaining access to the channel during the window as a result of the channel access procedure exceeds the second quantity of positioning reference signals to transmit during the window;

transmit the second quantity of positioning reference signals within consecutive positioning reference signal transmission opportunities of the at least the subset of the first quantity of positioning reference signal transmission opportunities; and refrain from transmitting the one or more positioning reference signals after transmitting the second quantity of positioning reference signals within a remaining quantity of the at least the subset of the first quantity of positioning reference signal transmission opportunities within the window.

13. The apparatus of claim 12, wherein the instructions are further executable by the processor to cause the apparatus to:

determine a portion of a positioning reference signal transmission opportunity remaining in the window subsequent to obtaining access to the channel during the window as a result of the channel access procedure; and refrain from transmitting the second quantity of positioning reference signals during the portion of the positioning reference signal transmission opportunity.

14. The apparatus of claim 12, wherein the instructions to transmit the second quantity of positioning reference signals within the consecutive positioning reference signal transmission opportunities of the at least the subset of the first quantity of positioning reference signal transmission opportunities further are executable by the processor to cause the apparatus to:

transmit a first positioning reference signal during a first positioning reference signal transmission opportunity of the at least the subset of the first quantity of positioning reference signal transmission opportunities; and transmit a second positioning reference signal during a second positioning reference signal transmission opportunity of the at least the subset of the first quantity of positioning reference signal transmission opportunities.

15. The apparatus of claim 12, wherein a portion of a first transmission opportunity of first quantity of positioning reference signal transmission opportunities occurs at a same time as a portion of a second transmission opportunity of the first quantity of positioning reference signal transmission opportunities.

16. The apparatus of claim 12, wherein the second quantity of positioning reference signals comprise a first positioning reference signal, and wherein the window comprises the first quantity of positioning reference signal transmission opportunities for transmitting the first positioning reference signal via a first beam.

17. The apparatus of claim 16, wherein the instructions are further executable by the processor to cause the apparatus to:

identify a second window comprising the third quantity of the at least the subset of the first quantity of positioning reference signal transmission opportunities via a second beam.

18. The apparatus of claim 12, wherein:

the second quantity of positioning reference signals comprise a first positioning reference signal and a second positioning reference signal;

a first positioning reference signal transmission opportunity of the first quantity of positioning reference signal transmission opportunities is for transmitting the first positioning reference signal via a first beam; and a second positioning reference signal transmission opportunity of the first quantity of positioning reference signal transmission opportunities is for transmitting the second positioning reference signal via a second beam.

19. The apparatus of claim 12, wherein the instructions to perform the channel access procedure further are executable by the processor to cause the apparatus to:

perform a first channel access procedure via a first beam and gaining access to the channel via the first beam; and perform a second channel access procedure by a second beam and gaining access to the channel via the second beam, wherein transmitting the second quantity of positioning reference signals is based at least in part on gaining access to the channel via the first beam and gaining access to the channel via the second beam.

20. The apparatus of claim 12, wherein the instructions to perform the channel access procedure further are executable by the processor to cause the apparatus to:

perform a first channel access procedure via a first beam and gaining access to the channel via the first beam; and perform a second channel access procedure by a second beam and failing to gain access to the channel via the second beam, wherein transmitting the second quantity of positioning reference signals further comprises transmitting the second quantity of positioning reference signals via the first beam and refraining from transmitting the second quantity of positioning reference signals via the second beam.

21. The apparatus of claim 12, wherein the instructions to perform the channel access procedure further are executable by the processor to cause the apparatus to:

perform a first channel access procedure to access the channel during a first positioning reference signal transmission opportunity of the first quantity of positioning reference signal transmission opportunities by a plurality of beams;

determine a channel access failure for at least one of the plurality of beams based at least in part on performing the first channel access procedure;

refrain from transmitting a positioning reference signal during the first positioning reference signal transmission opportunity based at least in part on determining the channel access failure;

perform a second channel access procedure to access the channel during a second positioning reference signal transmission opportunity of the first quantity of positioning reference signal transmission opportunities; and gain access to the channel for each of the plurality of beams during the second positioning reference signal transmission opportunity, wherein transmitting the one or more positioning reference signals is based at least in part on gaining access to the channel.

22. The apparatus of claim 12, wherein the instructions are further executable by the processor to cause the apparatus to:

determine a first quantity of symbols spanning a first positioning reference signal transmission opportunity of the consecutive positioning reference signal transmission opportunities of the at least the subset of the first quantity of positioning reference signal transmission opportunities;

determine a first comb spacing parameter associated with the first positioning reference signal transmission opportunity, the first comb spacing parameter indicating a quantity of resource elements between each resource element occupied by the one or more positioning reference signals; and map the one or more positioning reference signals to a first quantity of resource elements within the first quantity of symbols of the first positioning reference signal transmission opportunity according to the first comb spacing parameter, wherein transmitting the one or more positioning reference signals is based at least in part on mapping the second quantity of reference signals to the first quantity of resource elements within the first quantity of symbols.

23. An apparatus for wireless communication, comprising:

a processor; and memory coupled with the processor, the memory comprising instructions executable by the processor to cause the apparatus to:

identify a window comprising a first quantity of positioning reference signal transmission opportunities;

determine a second quantity of positioning reference signals to transmit during the window;

perform a channel access procedure to access the channel for transmission of the positioning reference signals during the window;

determine that a third quantity of the at least the subset of the first quantity of positioning reference signal transmission opportunities remaining in the window subsequent to obtaining access to the channel during the window as a result of the channel access procedure is less than the second quantity of positioning reference signals to transmit during the window; and transmit the third quantity of positioning reference signals over the at least the subset of the first quantity of positioning reference signal transmission opportunities remaining in the window.

24. An apparatus for wireless communication, comprising:
a processor; and
memory coupled with the processor, the memory comprising instructions executable by the processor to cause the apparatus to:
identify a window for receiving one or more positioning reference signals via a channel associated with channel access procedures, the window comprising a first quantity of positioning reference signal transmission opportunities;
determine a second quantity of positioning reference signals to receive during the window;
monitor one or more of the first quantity of positioning reference signal transmission opportunities during the window for the one or more positioning reference signals;
detect the second quantity of positioning reference signals within consecutive positioning reference signal transmission opportunities based at least in part on monitoring the one or more of the first quantity of positioning reference signal transmission opportunities;
determine that a third quantity of at least a subset of the first quantity of positioning reference signal transmission opportunities comprising the consecutive positioning reference signal transmission opportunities and a remaining quantity of positioning reference signal transmission opportunities within the window exceeds the second quantity of positioning reference signals to receive during the window; and
refrain from monitoring the remaining quantity of positioning reference transmission opportunities after receiving the second quantity of positioning reference signals within the consecutive positioning reference signal transmission opportunities.

25. The apparatus of claim 24, wherein the instructions are further executable by the processor to cause the apparatus to:
determine that a maximum quantity of positioning reference signals to be received within the window is the second quantity of positioning reference signals;
determine, after monitoring at least a subset of the one or more of the first quantity of positioning reference signal transmission opportunities, that the maximum quantity of positioning reference signals has been received; and
refrain from monitoring the remaining quantity of positioning reference signal transmission opportunities within the window based at least in part on determining that the maximum quantity of positioning reference signals have been received.

26. The apparatus of claim 24, wherein the instructions to detect the second quantity of positioning reference signals within the consecutive positioning reference signal transmission opportunities further are executable by the processor to cause the apparatus to:
detect a first positioning reference signal during a first positioning reference signal transmission opportunity of the consecutive positioning reference signal transmission opportunities; and
detect a second positioning reference signal during a second positioning reference signal transmission opportunity of the consecutive positioning reference signal transmission opportunities.

27. The apparatus of claim 24, wherein a portion of a first transmission opportunity of the consecutive positioning reference signal transmission opportunities occurs at a same time as a portion of a second transmission opportunity of the consecutive positioning reference signal transmission opportunities.

28. The apparatus of claim 24, wherein the instructions are further executable by the processor to cause the apparatus to:
determine a first quantity of symbols spanning a first positioning reference signal transmission opportunity of the consecutive positioning reference signal transmission opportunities;
determine a first comb spacing parameter associated with the first positioning reference signal transmission opportunity, the first comb spacing parameter indicating a quantity of resource elements between each resource element inhabited by the second quantity of positioning reference signals; and
monitor a first quantity of resource elements within the first quantity of symbols of the first positioning reference signal transmission opportunity according to the first comb spacing parameter, wherein detecting the second quantity of positioning reference signals is based at least in part on monitoring the first quantity of resource elements within the first quantity of symbols.

* * * * *